US008209278B1

(12) United States Patent
Straus

(10) Patent No.: US 8,209,278 B1
(45) Date of Patent: Jun. 26, 2012

(54) COMPUTER EDITING SYSTEM FOR COMMON TEXTUAL PATTERNS IN LEGAL DOCUMENTS

(76) Inventor: Jay Bradley Straus, New York, NY (US)

( * ) Notice: Subject to any disclaimer, the term of this patent is extended or adjusted under 35 U.S.C. 154(b) by 1095 days.

(21) Appl. No.: 11/726,808

(22) Filed: Mar. 23, 2007

(51) Int. Cl.
*G06F 15/00* (2006.01)

(52) U.S. Cl. .......................... 706/62; 705/1.1; 715/212

(58) Field of Classification Search .............. 706/62; 705/1.1; 715/212
See application file for complete search history.

(56) References Cited

U.S. PATENT DOCUMENTS

| | | | |
|---|---|---|---|
| 5,692,206 A | 11/1997 | Shirley et al. | |
| 5,717,939 A * | 2/1998 | Bricklin et al. | 715/212 |
| 6,067,531 A * | 5/2000 | Hoyt et al. | 705/35 |
| 6,934,905 B1 | 8/2005 | Tighe | |
| 7,080,076 B1 | 7/2006 | Williamson et al. | |
| 2003/0084004 A1* | 5/2003 | Morciniec et al. | 705/80 |
| 2004/0230453 A1* | 11/2004 | Belmore | 705/1 |
| 2006/0047649 A1* | 3/2006 | Liang | 707/4 |

OTHER PUBLICATIONS

Orasan et al ("CAST: a computer-aided summarisation tool" In Proceedings of Research Notes Sessions of the 10th Conference of The European Chapter of the Association for Computational Linguistics (EACL2003).*

Mark Wasson ("Using summaries in Document Retrieval" 2002).*
Kwok et al ("An Enterprise Electronic Contract Management System using Dual XML and Secure PDF Documents" EDOCS' Oct. 16-20, 2006).*
John C. Anderson ("Determinants of Bargaining Outcomes in the Federal Government of Canada" 1979).*

* cited by examiner

*Primary Examiner* — Lut Wong
(74) *Attorney, Agent, or Firm* — Michael J. Feigin, Esq.; Feigin & Associates, LLC

(57) ABSTRACT

A computer system is disclosed herein that surveys numerous legal documents which memorialize business or legal transactions and then determines common provisions in such documents. The forms of these "core provisions" are then stored in a knowledge base of the system. The system then allows attorney users to apply the system to analyze unsurveyed documents and use the knowledge base to recognize the core provisions that are most similar to the text of these unsurveyed documents. The user can then edit these unsurveyed documents in a rapid accurate fashion by automated means to revise text to match these core provisions. Document editing functionality is also present, along with means to use correlations to determine the likelihood of the presence/absence of specific provisions and the presence/absence of various particular documents in groups of documents used to memorialize certain types of transactions.

19 Claims, 7 Drawing Sheets

| Hierarchy Level | Corresponding Database | Information in the Database |
|---|---|---|
| 1. Projects | Each Kind of Project has a database associated with it. | Each such Database at this Level 1 of the Hierarchy contains data on the typical Level 2 materials (Documents) included in such Kind of Project.<br><br>This database can thus also be referred to as a "Document Database." |
| 2. Documents | Each Kind of Document has a database associated with it. | Each such Database at this Level 2 of the Hierarchy contains data on the typical Level 3 materials (Provisions) included in such Kind of Document.<br><br>This database can thus also be referred to as a "Provision Database" or a "Core Provision Database." |
| 3. Provisions | No unique database per Provision.<br><br>Information regarding provisions is stored in general dictionary files and the applicable Core Provision Database per Document Kind. | N/A |
| 4. Sentences | No unique database per Sentence.<br><br>Information regarding sentences is stored in general dictionary files. | N/A |
| 5. Phrases | No unique database per Sentence.<br><br>Information regarding sentences is stored in general dictionary files. | N/A |
| 6. Words | No unique database per Word.<br><br>Information regarding words is stored in general dictionary files. | N/A |
| 7. Letters | General storage as part of computer text files | N/A. |

FIG. 2

| SYSTEM: *Project View* | | | | |
|---|---|---|---|---|
| Client Name: InvestCo  Project Name: Purchase of stock of StartupCo | | Client/Project Number: 1111-234 | | |
| PROJECT KIND:  Project Type: Private Equity  Project Sub-type: Seed Financing Round | | | | |
| FUNCTIONS: | Document Name | Kind of Document (Type/Subtype) | Freq of this document type in this Kind of Project: | Freq of this document Kind in this kind of Project: |
| OPEN DOCUMENT IN DOCUMENT VIEW | Stock Purchase Agreement | Type: Stock Purchase Agmt.  Subtype: Private Entity | 100% | 100% |
| ANALYZE DOCUMENT FOR CORE PROVISIONS | Shareholders Agreement | Type: Investors Agmt.  Subtype: Shareholders | 91% | 89% |
| SHOW CORRELATION INFORMATION | Registration Rights Agreement | Type: Investors Agmt.  Subtype: Registration Rights | 91% | 72% |
| MAIL DOCUMENTS | Amend Cert. of Inc. re Preferred Stock | Type: Organizational Doc.  Subtype: Cert. of Inc. Amend | 85% | 62% |
| ADD DOCUMENT TO PROJECT | Amendment of bylaws | Type: Organizational Doc.  Subtype: Bylaws amend | 85% | 31% |
| REMOVE DOCUMENT FROM PROJECT | | | | |

FIG. 3

| |
|---|
| CORE PROVISION DATABASE FOR DOCUMENT OF KIND: |
|     Document Type:    Software License Agreement |
|     Document Sub-Type:    Licensee Favorable with Technical Support Levels |
| Core Provisions of Kind: |
| Type:    Indemnity |
| Sub-type:    General and Intellectual Property |
|     Core Provision #1 (30 words)<br>    Favorability = 9.6, Length = 219<br>    Text = Licensor shall indemnify, defend and hold harmless Licensee for all damages arising from this Agreement. Such obligation is conditioned on Licensee providing sufficient notice to Licensor to effect such indemnificaton. |
|     Core Provision #2 (41 words)<br>    Favorability = 8.9, Length = 292<br>    Text = Licensor shall indemnify Licensee for all damages from Licensor's breach of any of Licensor's representations, warranties or covenants set forth herein. However no indemnification or similar obligations shall apply unless Licensee allows Licensor to control the conduct of any such defense. |
|     Core Provision #3 (23 words)<br>    Favorability = 7.6, Length = 162<br>    Text = Licensor shall indemnify, defend and hold harmless Licensee from any infringement of the Materials on any third party intellectual property or proprietary rights. |
|     Core Provision #4 (13 words)<br>    Favorability = 9.2, Length = 91<br>    Text = Licensor shall indemnify Licensee for all damages from Licensor's breach of this Agreement. |
| Core Provisions of Kind: |
| Type:    License Grant |
| Sub-type:    License to software for internal use |
|     Core Provision #5 (11 words)<br>    Favorability = 6.1, Length = 55<br>    Text = Licensor hereby grants to Licensee a license to use the Software. |
|     Core Provision #6 (33 words)<br>    Favorability = 9.7, Length = 229<br>    Text = Licensor hereby grants to Licensee a worldwide, perpetual, irrevocable license to use, reproduce and store the Software and all related documentation. Such license includes a right to market the Software to potential customers. |
| Core Provisions of Kind: |
| Type:    License Grant |
| Sub-type:    License to software to use and sublicense |
|     Core Provision #7 (29 words)<br>    Favorability = 8.4, Length = 182<br>    Text = Licensor hereby grants to Licensee a license to use the Software and sublicense the Software to other customers that make payment therefor, as set forth herein, directly to Licensor.. |

FIG. 4

| CORE PROVISION TYPE | Document: LICENSE AGREEMENT 1 Most similar core provision to actual text: | Document: LICENSE AGREEMENT 2 Most similar core provision to actual text: | COMPARISON | REDLINE OF ACTIAL TEXT |
|---|---|---|---|---|
| Software License Grant | Type: Software License Grant<br>Subtype: With derivative works<br>12 words<br>Section in Document: 2.1<br><br>Favorability: +9.2 | Type: Software License Grant<br>Subtype: Internal use only<br>18 words<br>Section in Document: 1,3<br><br>Favorability: +6.4 | Document 1 more favorable (+ 9.2 compared to +6.4 for +2.8 difference) | Licensee may, ~~for its internal business use only,~~ use, store, distribute and create derivative works from the Software. |
| Indemnification | Type: Indemnificiation<br>Subtype: Any breach or neglig.<br>20 words<br>Section in Document: 12.1(b)<br><br>Favorability: +8 | Type: Indemnificiation<br>Subtype: IP infringement<br>24 words<br>Section in Document: 9.2.1<br><br>Favorability: +3.1 | Document 1 more favorable (+ 8 compared to +3.1 for +4.9 difference) | Licensor shall indemnify Licensee for any loss, claim or damages arising from Licensor's <u>negligence or its breach of this Agreement</u> nfringement ~~of any third party intellectual property or other proprietary rights~~. |
|  |  |  | SUMMARY:<br>Document 1 is more favorable<br>(by an average favorability rating per provision of 3.85) |  |

FIG. 6

COMPUTER EDITING SYSTEM FOR COMMON TEXTUAL PATTERNS IN LEGAL DOCUMENTS

CROSS-REFERENCE TO RELATED APPLICATIONS

Not Applicable.

FEDERALLY SPONSORED RESEARCH

Not Applicable.

SEQUENCE LISTING OF PROGRAM

Not Applicable.

BACKGROUND OF THE INVENTION

1. Field of Invention

This invention relates to legal document computer systems, specifically as used to analyze and edit such documents or sets of such documents.

2. The Prior Art

The prior art consists of various approaches for the initial creation of a draft of a legal agreement by assembling contract provisions contained in a computer database. The agreement is assembled by adding provisions sequentially, one on top of the other, like stacking building blocks. Once assembled, the initial draft can then be sent by a law firm to opposing counsel to begin negotiations. Some examples of such prior art are disclosed in U.S. Pat. No. 5,692,206 issued to Shirley et al. (1997), U.S. Pat. No. 6,934,905 issued to Tighe (2005) and U.S. Pat. No. 7,080,076 to Williamson et al. (2006).

A computer database of contract provisions is actually an excellent idea. However, its application in the context of the prior art is essentially useless. This is because law firms have no need for the prior art's technology. The reality of law firm practice is that law firms already have standard model documents which are already drafted and ready for use. Thus, they have no need to assemble documents using a legal text database. The documents are already assembled.

An Example of Actual Law Firm Practice:

A Stock Purchase Agreement.

As a more specific example of why the prior art is not useful, consider a start-up company that wants to raise capital. It can do this by privately selling stock to investors pursuant to a stock purchase agreement.

In such a situation, the company would approach its law firm and ask them to prepare a stock purchase agreement. The law firm would likely also prepare a disclosure document, describing the company to the potential investors and setting forth the potential risks of the investment.

The law firm would accomplish these tasks by virtue of the fact that it would already have model documents on its computer system. It would already have a template stock purchase agreement available for use on its word processing system. It would already have a template disclosure document. So to prepare new drafts for the company, it would simply take these template forms, fill in the company's name and address, and the documents would be ready to be sent to the opposition (i.e. the investors and their law firm).

Of course there are situations more complicated than simply filling in a name and address. There may be risks specific to the company's proposed business that need to be included in the disclosure document. Or the proposed investment may have non-standard terms regarding profit sharing or atypical restrictions on the investors' assigning their newly purchased interests in the company.

In those instances, standard practice is for a law firm to choose the most similar versions of the same kinds of documents that it has worked on for a different, previous client. Using these most similar versions, the law firm would change the previous client's name and address, and then further revise the documents as necessary. Sometimes it might even use other sample documents from multiple previous clients to assist in the process. Perhaps one client's prior deal had one similar aspect of the current deal but a different prior deal had another aspect. However, even in that circumstance, simple cut and paste functionality available in any commercial word processing program quickly and easily allows for combining text as necessary.

In other words, the use of a separate contract provision database program to assemble an initial set of documents is not particularly helpful, since the documents are nearly fully assembled at the outset. The use of a separate program for such a database would, in the foregoing context, simply be cumbersome and a distraction.

Same Process for all Documents.

Such use of standard forms, or recycling old documents used for previous clients with some minor changes, is the reality of law firm practice today. It is as true for drafting a stock purchase agreement as it is for drafting an agreement for a loan or for a sale of real estate. This is because it simply doesn't make sense to "reinvent" the wheel by assembling each document over and over again from scratch. The time and energy involved in such an approach rule it out on efficiency grounds. Furthermore, such an approach of new document assembly introduces additional risks to the process—key aspects of documents might be accidentally left out in the assembly process.

OBJECTS AND ADVANTAGES

Several objects and advantages of the present invention are:

(a) to provide a method to survey sets of existing legal documents to determine common textual patterns within specific kinds of documents;

(b) to provide a method to survey sets of existing legal documents to determine correlation and anti-correlation information regarding the common presence or absence of specific pairs of provisions or pairs of documents;

(c) to provide a user interface to allow a user to designate a set of documents as an overall "Project" and to add and remove specific documents from the Project;

(d) to provide recognition functionality so that provisions in previously unsurveyed documents may be recognized as similar or identical to common textual patterns determined by the survey functionality;

(e) to provide a user interface to allow a user to edit the text of specific documents, including to match more closely to common textual patterns determined by the survey functionality;

(f) to make available common textual patterns organized by attributes such as length and favorability;

(g) to integrate the method with a document management system;

(h) to integrate the method into a system whereby multiple users may suggest edits to a single document; and (i) to allow comparisons of documents with similar kinds of provisions in different sequences in the two documents being compared.

Further objects and advantages will become apparent from a consideration of the ensuing description and drawings.

SUMMARY

In accordance with the present invention, a method is disclosed to survey sets of legal documents and determine common patterns in such documents, particularly common textual patterns. Such common textual patterns are then organized by key attributes such as length and favorability. A graphical user interface is also provided to allow an attorney user to analyze existing legal documents that have otherwise never been surveyed by the System. The System includes recognition functionality so that provisions in the unsurveyed documents can be matched to the most similar common textual patterns determined by the survey process. The attorney user can then edit these existing legal documents to revise their text to more closely match the common textual patterns determined in the survey process, as desired. In particular, the attorney user can choose to revise provisions to reflect the desired length and favorability attributes previously established. Additionally, the attorney user can input further information into the survey databases which the system, or the attorney user, "learns" during an analysis of an existing document. The end result is that an attorney user can receive a set of proposed documents from opposing counsel and revise the documents with great speed and accuracy in a manner not available through the prior art. The prior art focused on the initial drafting of existing documents, which is not useful in revising existing documents, and is also essentially useless, since most law firms already have a wide selection of standard template documents already drafted and ready for use. Furthermore, by breaking down documents into their common textual patterns, or "Core Provisions," computer redline document comparisons can be performed that were previously impossible. Finally, the method can be integrated into a broader shared document management or common editing functionality.

DRAWINGS

Figures

FIG. 2 shows a level hierarchy used by the System to organize projects, documents and their contents.

FIG. 3 shows the project view of the graphical user interface of the System, where a user can add or remove specific documents from a given set of documents collected together as a single project.

FIG. 4 shows an excerpt from a sample provision database containing information regarding Core Provisions, which are the common provisions that frequently recur in specific kinds of documents.

FIG. 6 shows an excerpt from a proprietary document comparison method of the System, where a meaningful comparison of two different documents can be generated even if their generally corresponding provisions which are the true subject of the comparison are in different sequential orders in the two documents.

PREFERRED EMBODIMENT

A. Brief Introduction to Functionality.

In order to more clearly describe in detail the various components of the present invention, it is useful to first present a brief initial summary of the functionality of the invention.

In contrast to the prior art, the present invention disclosed herein does not focus on the initial assembly of documents. The present invention involves the analysis and revision of existing legal documents. Typically the documents being reviewed and revised by a law firm are received from an opposing party's law firm in the course of a deal. In other words, the documents are unfamiliar to the law firm preparing revisions. The present invention disclosed herein (the "System") thus assists the law firm to quickly and accurately revise, or "mark up," the documents that were received.

More specifically, the present invention provides three broad types of functionality:

1. FUNCTION #1: The analysis of large numbers of sample legal documents to see patterns in these sample documents. The System essentially takes a "survey" of lots and lots of deals and documents to find such "patterns." Such patterns could be the kinds of provisions commonly seen in specific documents (referred to herein as "Core Provisions"), the text of such provisions, and the kinds of documents which make up specific deals (e.g., what documents are present in an investment in a company, in a real estate closing or in a bank loan). The patterns could also involve correlations (e.g., provision type #1 is almost always seen along with provisions type #2, but almost never with provision type #3). The analysis results would be stored in computer databases. Functionality is also provided for attorney input (i.e. human input) to expand or otherwise revise the information that the System has "learned."

2. FUNCTION #2: Review of specific proposed draft documents by comparing the proposed draft documents to the information "learned" by the system during Function #1. For example, if a real estate closing is proposed, does the purchase agreement have the proper provisions? Is the text of the provisions that are included the same as the text commonly seen? Is a provision missing? Is a document missing? Is a provision or document present that should be omitted? The System recognizes what is similar to and what is different from the information learned during the survey process. The results of the System's analysis would be made available to its users (i.e. attorneys working at a law firm) through an appropriate interface. Not only would the analysis indicate what portion of the draft documents is typical and what portion is atypical, the System would also suggest corresponding changes.

Figure 1:
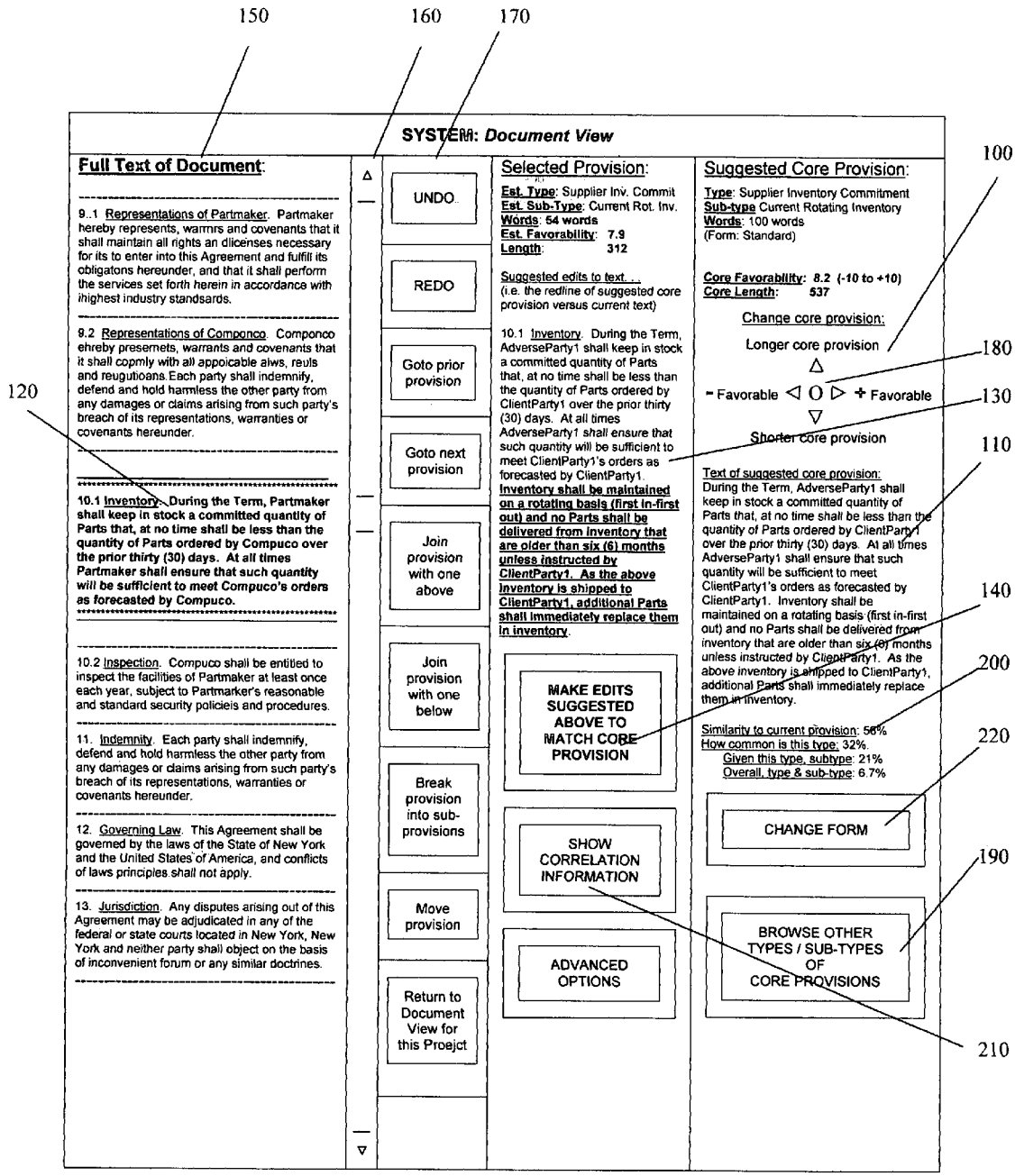
FIG. 1 shows the document view of the graphical user interface of the System, where a user can review and edit the text of a specific document.

3. FUNCTION #3: Ability to edit the proposed draft documents. The System's analysis of what needs to be changed in a given document would be linked to document edit functionality. The user of the System could thus run a proposed document through the System, obtain a suggested change (per Function #2) and then implement the change by causing the document to be edited to fully or partially implement the System's proposed change. The System could perform the edit on behalf of the user, or the user could directly edit the text. Once revised, the user is then free to send the revised document back to the opposing counsel. Means of distribution, such as email, could also be incorporated into the System as desired, or an external pre-existing means of distribution could be used. A sample of a graphical user interface, where a document is being analyzed by the System and a suggested edit of one document provision to more closely match a "Core Provision" is being suggested, is shown in FIG. 1.

Thus, the System greatly reduces the amount of time to revise a document and increases the accuracy and completeness of a reviewing law firm's work product.

B. Description of Components of System and Figures.

Now that the broad functionality of the System has been described, the specific components making up the System are set forth below.

1. COMPONENT #1: Hierarchical Structure. As an initial organizational matter, the software System set forth herein involves the establishment of a hierarchy of computer text information into different levels. Each level is processed and treated in a slightly different fashion, as will be further disclosed herein. This hierarchical level organizational approach is COMPONENT #1 of the System.

A chart summarizing some information about the hierarchical levels, as will be further detailed herein, is shown in FIG. 2.

a. LEVEL 1—PROJECTS. Projects (also sometimes called "deals" or "matters") represents the grouping of computer files or documents for a given law firm client that corresponds to a particular project for that client. For example, suppose a law firm has a client that manufacturers auto parts (called "PartsCo"). That client might approach the law firm for assistance in negotiating a joint venture with a third party (called "OtherCo") to enter a new line of business where they together provide consulting services to the auto industry. The work product created or analyzed by the law firm for this matter, as stored on the law firm's computer systems, would constitute a single "Project" for its client PartsCo. If later in the year PartsCo came back to the law firm for help with leasing a manufacturing plant, that lease of the plant would also constitute a new and distinct Project for PartsCo.

b. LEVEL 2—DOCUMENTS. The most important legal documents are generally agreements, but other documents are possible as well. For example, if PartsCo wants to enter into a joint venture with OtherCo, some documents that might be involved in that project are: (i) a certificate of incorporation to form a corporation that will be the joint venture entity that they use to actually provide the consulting services (called "Joint Corp."); (ii) bylaws for Joint Corp.; (iii) resolutions of the board of directors of Joint Corp. appointing officers and issuing shares to PartsCo and OtherCo; and
(iv) a shareholders agreement between PartsCo and OtherCo regarding their intent to operate Joint Corp. as a consulting business. Those four documents would make up that joint venture Project for PartsCo. As another example, if PartsCo wanted to lease a new manufacturing plant, the relevant documents might be: (i) a letter of intent to buy the plant, subject to further due diligence by PartsCo; (ii) an engineer's report conducted as part of the due diligence; (iii) a lease agreement signed by PartsCo where it agrees to lease the plant; (iv) a closing certificate from the lessor confirming that the plant is in good condition to be leased by PartsCo, and (v) a receipt from the lessor evidencing the initial rent payment by PartsCo. Together, these five documents make up the project for PartsCo of leasing the new manufacturing plant. In other words, the collection of all relevant documents make up a given client's Project.

c. LEVEL 3—PROVISIONS. A legal agreement can be broken down into a collection of related provisions. These provisions are generally present in an agreement in numbered fashion, e.g. Section 1, Section 2, etc. Each provision typically pertains to a specific concept and is usually a paragraph long.

For example, a company called Partmaker might enter into an agreement to sell parts to a client. In that agreement, there might be a provision where Partmaker confirms that it will conduct its business in a lawful manner, such as follows:

Section 9.1 Representations of Partmaker. Partmaker hereby represents, warrants and covenants that it shall maintain all rights and licenses necessary for its to enter into this Agreement and fulfill its obligations hereunder, and that it shall perform the services set forth herein in accordance with highest industry standards.

A collection of provisions makes up a document.

d. LEVEL 4—SENTENCES. Generally provisions are about a paragraph long, and so they are made up of multiple sentences. Thus, the collection of relevant sentences make up a paragraph.

e. Level 5—PHRASES. For reasons that will become clearer later on, the next level after sentences is phrases, not words. This is because it will be useful to recognize certain phrases that appear frequently in legal documents, even though the specific sentences in which they are contained may vary.

f. Level 6—WORDS. Clearly, multiple words make up phrases g. Level 7—LETTERS. Letters (or, perhaps even more generally, alphanumeric characters), are naturally at the bottom most level of the hierarchy. Ultimately, all documents are collections of alphanumeric characters and are essentially stored as such in each law firm's applicable computer database.

2. COMPONENT #2: Database regarding Documents in Projects. Component #2 of the System is a computer database for each kind of project containing information on the documents typically contained in such projects (each, the project's "Document Database").

As an aside, it is worth noting that since computer databases can be combined into one larger single database with different segments of the larger database corresponding to different smaller combined pieces, the distinction of whether they are separate databases, or separate designated sub-databases within a larger databases, may be largely a matter of semantics. References herein to specific databases should thus be understood in this context, e.g. a different database for each kind of project is not materially distinct for purposes of the System from a single database containing multiple portions thereof corresponding to each kind of project.

In addition, what is meant by a particular "kind" of project also merits some initial discussion: Each project is classified in the System for organizational purposes by that project's "type" and "sub-type." For example, a type of project might be a real-estate lease. Different sub-types might then be a residential lease, a manufacturing plant lease, or an office space lease. As another example, a type of a Project might be a merger, where possible sub-types would be a hostile merger, parent-subsidiary merger or a negotiated merger.

The System would allow for individual law firms to customize the applicable types and sub-types of a Project. Thus, a law firm that works on many real-estate matters might have many distinct sub-types for leases, but a law firm that does mostly wills would likely need only a few lease sub-types. It is likely the System would include a certain minimum number of types and sub-types as default categories as well.

Thus, a given "kind" of project would be determined by its type and sub-type. In other words, if in a given year a law firm worked for hundreds of clients, but for four of those clients is worked on mergers that were negotiated mergers, it would have worked on four projects of this "kind." Each such project would be of a "merger" type and a "negotiated merger" subtype.

Each kind of Project would have its own Document Database. For each kind of Project, the Document Database for such kind would include information on the kinds of documents generally included in that kind of Project. For example, for the merger/negotiated kind of Project, the corresponding Document Database might record information to the effect that the System has taken a survey of all these kinds of Projects it has ever analyzed, and a merger agreement is present in 100% of these kinds of Projects. If might also record that a warrant agreement (i.e. so that warrants can be issued to certain key employees) would be present in 20% of the Projects of this kind that it has surveyed.

This can be very useful information. For example, suppose a law firm is representing a client that wishes to merge into a target company. In that case the target company might send over a draft set of documents to effect the merger, including warrant agreements for the benefit of certain of the target company's key executives. The client's law firm would start a new Project in the System and add these received documents to that Project. The law firm would then use the System to analyze the documents in this new Project and the System would output its analysis. One item the System might note is that warrant agreements, included in the draft documents received, are actually present only 20% of the time, i.e. 80% of the time they are absent. The System would then output a suggestion to remove these agreements from the Project, since they are not standard documents for inclusion. Of course, the attorneys using the System could ignore the suggestion, but the information would be very useful to the client's law firm in terms of reviewing the draft documents and providing a response to the target company.

Note that if the warrant agreements were absent, the System would note this as well—it would indicate that in 20% of these kinds of Projects warrant agreements are present. It could then provide a suggestion that such documents be included. Furthermore, the law firm might want to do this (i.e. include warrant agreements) even if it doesn't immediately appear favorable to its own client. For example, perhaps the target company is otherwise being difficult in the negotiations and the inclusion of these warrant agreements would make the deal more attractive to the target. Thus, the inclusion of the warrant agreements would be a good idea that might help close the deal, where this idea might not have occurred to the law firm without the analysis of the System.

More sophisticated information regarding correlations and anti-correlations would also be included in the Document Databases. For example, in taking a survey of the "mergers/negotiated" kind of Projects, the System might note a correlation that when a warrant agreement is present in a particular kind of Project, 80% of the time warrant certificates are also present (warrant certificates serve as a conventional type of evidence that warrants have been issued, but are not always necessary given the presence of a signed warrant agreement). This information can be used in the process of representing the client as well—perhaps the target company sent over draft warrant certificates as part of the deal. If the law firm knows that such certificates are present 80% of the time, it would be less likely to waste time negotiating time to get them removed. Similarly, the Document Database for the particular Project might record survey information that when warrant agreements are present, option agreements are almost never present (i.e. anti-correlation information). Thus, if both option agreements and warrants agreements were sent over by the other side, the System would suggest that one of these kinds of agreements be deleted.

3. COMPONENT #3: Graphical User Interface. Component #3 of the System is a graphical user interface (or "GUI"). In order for the System's suggestions to be communicated to the user, and to allow for the suggestions to be implemented, the System requires a user interface. In the preferred embodiment this would be a windows based graphical user interface.

a. Different Views. Furthermore, while the GUI would be a single integrated interface, allowing access to nearly all the functionality of the System, the GUI would have different screens, or "views," available to the user depending upon the particular functionality being accessed. In particular, there are two views that are of critical importance to the functioning of the System. These are the "Project View" and the "Document View."

b. Project View. The functionality described above in the description of Component #2 (the Document Database for each kind of Project) would be effected through the Project View of the GUI. This view would show the documents contained within a specific Project and contain "button" or similar type controls for a user to perform functions with respect to the contents of that Project. A sample view of the Project view is shown in FIG. 3.

c. The Document View. While the Project View is clearly of great importance, most of a user's time spent working with the System will be within the Document View. The Document View will show, among other things, the content of an individual document and provide means to revise it. While, strictly speaking, the Document View is a part of Component #3 (i.e., the overall GUI) it is sufficiently important that is also treated separately as an individual component of the overall System, and is thus described in greater detail later in this specification, in the form of Component #5. A sample view of the Document View is shown in FIG. 1.

4. COMPONENT #4: Database regarding Provisions in Documents. COMPONENT #4—Component #4 of the System is a collection of computer databases, one for each "Kind" of document, of the provisions typically contained in that kind of document (each, the document kind's "Provision Database"). The frequently encountered provisions are referred to as "Core Provisions."

The presence of this Provision Database is indicated in level 2 of the summary chart of hierarchical levels shown in FIG. 2. A representation of an excerpt of contents of one sample Provision Database, namely for the Kind of Document identified as being of a type "Software License Agreement" and sub-type "Licensee Favorable with Technical Support Levels" is shown explicitly in FIG. 4.

a. Kind of Document for each Provision Database. Similar to the matter discussed previously as to the "kind" of a Project, it is initially worth noting what is meant by a particular "kind" of document. Just as before, each document is classified by its type and sub-type.

Thus, a given "kind" of document would be determined by its type and sub-type. If in a given year, a law firm worked for hundreds of clients, but during that year it worked on asset purchase agreements of a goods manufacturer, it would have worked on twelve documents of this kind (i.e. of the "asset purchase agreement/goods manufacturer" kind). By analyzing the provisions contained in these twelve documents, the System would essentially take a "survey" to populate the provision database corresponding to this kind of document. This database would contain, among other things, the text of the various provisions commonly seen in this kind of document. Nor would the applicable Provision Database necessarily be limited to the provisions contained in those twelve documents for which the law firm was hired to provide services. As will be further discussed, the law firm could choose to process other sample documents through the System, even if the firm had never before worked on those documents for its own clients (i.e. perhaps it obtained other copies from public filings or other law firms) to further enhance the "knowledge" of its copy of the System in this area. This will be further described below.

b. Kind of provisions. Just as Projects and Documents are broken up into different types and subtypes, as will be further explored, the Provisions within the Provision Databases will also be broken out by type and sub-type.

c. Core Provisions. When the System conducts a survey of documents as part of the survey process, it seems theoretically possible (depending on specific settings of the System) that every provision that the System processes can be recorded in its databases. However, this is no the standard approach. The standard, and more useful approach, takes into account that it is important to distinguish between a provision that the System "sees" once and a provision that it sees over and over again.

In other words, only a provision that is frequently encountered in an identical or substantially identical form would be recorded in the System's database as a "Core Provision." Such common provisions are called "Core Provisions" because they are the core constituents making up so many of the given kind of documents. Note that to the extent that a user would want to include a particular provision in the System's database for classification as a Core Provision, functionality would be provided to accomplish such an inclusion. This is true even if the System has not seen the provision frequently (or even more than once). A provision in a document which is analyzed by the System and recorded in its databases for other purposes, but not accorded status as a "Core Provision" would be deemed to be a "Non-Core Provision."

It is important to understand the reason for the distinction between provisions in general, and Core Provisions specifically. Core Provisions are of unique value as a concept because an underlying approach in the drafting or editing of legal documents is to use the same language over and over again, to the greatest extent possible. This is because if a lawyer drafts something new, it is easy to make a mistake. Such a mistake might even not be apparent on close examination if a lawyer is not well versed in a particular area—subtle changes in phrasing can sometimes have dramatic consequences for tax purposes or other regulatory compliance issues. Thus, lawyers often try to keep the amount of text that is truly "new" to a minimum. Language which is "old" has essentially been vetted over time as acceptable for its intended purpose. Often the language has also acquired particular meaning within the legal community by convention, or even by court decisions which interpret the language when it is contained within a contract which is the subject of a dispute. Using such established language patterns is thus a preferred approach, so to the extent that the System encounters provisions through its analysis of legal documents that are atypical, such atypical provisions are of lesser value. Indeed, their primary value is to bulk up the overall knowledge base of the System to assist in its recognition functionality.

This idea of a Core Provision is probably best illustrated by an example. Suppose a law firm's client, the car manufacturer CarCo, is buying some parts to include in its computers from a supplier, SupplierCo. It is buying these parts pursuant to the kind of agreement identified as "Purchase Agreement/Manufacturer Purchase from Supplier." The following document section, Section 10.1, is a sample provision that could be excerpted from this agreement for the sale of parts from SupplierCo to CarCo:

3.9. Inventory Management. During the Term, SupplierCo shall keep in stock a committed quantity of Parts that, at no time shall be less than the quantity of Parts ordered by CarCo over the prior thirty (30) days. At all times SupplierCo shall ensure that such quantity will be sufficient to meet CarCo's orders as forecasted by CarCo. Inventory shall be maintained on a rotating basis (first in-first out) and no Parts shall be delivered from inventory that are older than six (6) months unless instructed by CarCo. As the above inventory is shipped to CarCo, additional Parts shall immediately replace them in inventory.

If the System sees this type of provision sufficiently frequently in this kind of document, it will learn that this is a common provision in these types of documents, and classify it as a "Core Provision" for this "Kind" of agreement. Then, in the future, when the System analyzes documents that contain provisions which are similar but slightly distinct from an established Core Provision, the System can note the similarity and can, among other things, suggest a revision to make the text match that of the Core Provision.

The Provision Database for each Kind of Document thus includes the Core Provisions, as determined by the System, for that Kind of Document.

d. Identifying the Text of Core Provisions. The foregoing explanation of Core Provisions leads, naturally, to the question of how the System actually identifies the common provisions that should qualify as Core Provisions. Broadly speaking, Core Provisions are identified by the System processing many sample documents, "recognizing" the words patterns that appear frequently in identical or substantially identical form, and then recording such patterns as Core Provisions. More specifically, while there may be different techniques to accomplish this identification, it is anticipated that the preferred embodiment would use a sequence of four steps as follows:

1. Step #1 of Identifying Core Provisions: Import the text of sample Provisions into the System. Each provision contained in a document analyzed by the System would, at least initially, be separately and distinctly imported into the System for analysis. As part of this process, each provision identified in a document would typically have any unique names of parties or other unique identifiers stripped out (at least for these internal analysis purposes) and replaced with standard alternatives to make the provisions more uniform across different samples of the kind of document in question. For example "CarCo" could be replaced internally by "Client" and "Partmaker" by "Counterparty" since the parties would likely have different names in different agreements. Each provision that is identified within the sample documents analyzed would be assigned a unique identification number or other means of identification, such as sequential storage in a computer array.

2. Step #2 of Identifying Core Provisions: Assign Checksums to Each Imported Sample Provision. A "checksum" would be calculated for each provision. While such a checksum could serve as a relatively unique characteristic number for the provision, more importantly provisions that have checksums which are similar in value are themselves probably similar in their text. For example, a simplistic version of such a checksum would be the number of words, or the number of characters, in a given provision. Clearly, similar provisions would have a similar number of words or characters. A somewhat more useful version of such a checksum would be a weighted sum of the characters, e.g. A could count as "1", B could count as "2" and the checksum would be computed by adding up the values of all these characters contained in a given provision. The mathematical difference between such checksums for two different provisions would thus provide a quick quantitative estimate of how similar are those two provisions. The closer the values of the checksums, the more similar the two provisions are likely to be.

3. Step #3 of Identifying Core Provisions: Make More Detailed Similarity Calculations.

(a) Why more detailed similarity is necessary here. Checksums are useful for quick estimates for identifying similar provisions, but they are only estimates. They are, in other words, useful for a quick initial pass to determine which provisions would be most fruitful to compare against one another, but then a more detailed comparison is required to truly determine similarity. Thus, the next step would be for each provision imported into the System to be compared to other provisions of similar checksums (i.e. the choice of provisions to be compared against one another would be based on initial estimates of similarity resulting from the checksum procedure). The similarities between each pair of these provisions would then be more precisely calculated.

A simple example shows that this more precise calculation is necessary because reliance solely on checksums is insufficient in this context: consider the words "mad" and "dam." Each have the same number of letters, and would each have the same checksum, but clearly they are different words.

Ultimately, the purpose of these provision comparisons is to find clusters or groups of similar provisions. This clustering together into sufficiently similar forms then allows the identification of the "Core Provisions."

(b) How to conduct more detailed similarity calculations. The issue then is how to conduct the more precise similarity calculation which is called for. The approach set forth herein involves counting the number of discrepancies between any two provisions being compared. Each character that has to be deleted from provision #1 to make it look like provision #2, and each character that as to be added to provision #1 to make it look like provision #2, would be considered a "deviation." Then a similarity can be calculated and defined by the following formula, where a value of 1.0 means exact similarity between provisions and a value close to 0.0 means no similarity is present:

$$similarity = actual\ text\ length / (actual\ text\ length + \#deviations)$$

In general, it is anticipated that the "actual text length" to be used would be the smaller of the lengths of the two provisions being compared. This use of the smaller length tends to give greater impact to the number of deviations in the calculations. This can be seen by a simple example: suppose the text "a" was compared with "abcdefghij." It appears there are 9 deviations (i.e. the 9 letters "bcdefghij" need to be added to the first string to obtain the second) here and the two text strings are quite dissimilar. If the larger length of 10 was used, the result of the similarity formula would be 10/(10+9)=10/19 or a little over 0.5. This suggests a moderate amount of similarity (i.e. about halfway between the extreme of 0, or no similarity, and 1, complete identity). Clearly this is not optimal, as the provisions are quite dissimilar. If the text length of the smaller string is used, i.e. 1 since there is just one character in the string "a", the similarity formula provides a result of 1/(1+9)= 1/10 or 0.1. This is thus a much more representative result, which properly shows that the two provisions are not really very similar at all.

Note that other similarity measurements are possible. The formula suggested above is merely a reasonably accurate approach with the advantage of being subject to rapid calculation. In addition, arguments could be made that a better choice for the text length to be used in the formula would be an average of the two lengths, not the smaller length. Nevertheless, for most purposes it appears the smaller length provides a more useful result.

Regardless of the precise formula chosen, an issue now remains as to how to specifically calculate the number of deviations. For a simple string comparison, such as "a" and "abcdefghij" the differences in the text is clear. However, the issue is not as clear when comparing two provisions which are longer and more detailed. In that instance, as next discussed, a more detailed approach is necessary.

(c) Use Redline Approach to Calculate Deviations. The need to compare text strings is a commonly encountered task, particularly in legal documents. The visual output of such a comparison is often called a "redline" or "blackline" where new text which is added is shown in a different style or color, such as underlined and bold faced, while text which is deleted is also distinctly indicated (e.g. it can be shown in red font with a "strike through" line in the middle of the deleted text). Occasionally text which is identified as having been moved from one place to another is distinctly indicated as well.

Since the process of creating a redline is sufficiently common, there are likely to be standard computational algorithms to carry out such a task. Nevertheless, for completeness a simple algorithm to accomplish this is proposed herein.

First of all, a minimum possible deviation segment is generally necessary. What is meant by this is that for text of substantial length, it is not meaningful to show a letter by letter set of deviations, as this is confusing and misrepresents the nature of the differences. For example, suppose one is comparing the sentence "The parties agree to meeting and discussion sessions to address future price changes" with "The parties agree to drafting and to discuss matters pertaining to future price charges." If we show added text in all caps, and deleted text in brackets, a useful comparison redline of sentence 2 against sentence 1 would be: "The parties agree to DRAFTING AND TO DISCUSS MATTERS TO ADDRESS [meeting and discussion sessions pertaining to] future price CHARGES [changes]." This resulting redlined sentence clearly and distinctly demonstrates the changes in a useful manner.

Contrast this with the following possible redline output: "The parties agree to DRAFT[meet]ing and TO discuss[ion] MATTER[session]s PERTAINING[to address] future price chaR[n]ges." If you read this alternative output through, letter by letter, you will find that it is in fact a correct redline. However, it is confusing and less useful than the former result. This is because the "resolution" of the changes is too fine—a user of a redlining algorithm generally does not want to see potential letter by letter changes. The changes need to be of a larger size so as to be appropriately grouped together and displayed in the redline format.

Thus, an appropriate redlining algorithm would break up the text for comparison into blocks of certain minimum sizes, either word by word, or a minimum character size (this could be adjustable, likely 5 or 10 characters would be appropriate). Once the two text strings are broken up into these blocks, the algorithm involves searching for identical blocks, and then finding the largest consecutive sequence of identical blocks. Once found, this area of the text would serve as an initial location on which to "build out" the resulting redline. This largest sequence of identical text would be shown as unchanged in the redline output, and then the algorithm would involve walking forward and backward from that point, indicating whether whole blocks are to be marked as added, deleted, or unchanged. A refinement of this approach would be to consider whether there are other large sequences of identical text. Again the criteria for qualification as such a large sequence could be adjustable (perhaps 25-30 characters would be a minimum size). These other large sequences of identical text, although perhaps not the single largest such sequence, would also be recorded in the redline algorithm as being unchanged. Then the "walk forward" and "walk backward" approach for comparison would involved showing the blocks of text between such identical sequences as either deleted or added.

Again, it is worth noting that foregoing approach is merely one possible means of implementing a redline comparison (both for output to a user when necessary, and for internal calculations in the System considered here). More sophisticated algorithms may be currently available or later developed. The present redline algorithm is only one possible embodiment.

In terms of internal use within the System, as described in this section, the redline would be used to compare possible provisions and identify deviations between them. Once the deviations are determined, they can be used in the similarity formula presented previously to obtain a more accurate quantitative assessment of how similar are the two provisions being compared.

4. Step #4 of Identifying Core Provisions: Identify a group of identical common provisions. Once each provision has initially been compared against all others (first by rough checksum procedure, and then by more refined similarity calculations on a smaller subset identified in the first pass) it is possible to identify groups or clusters of provisions that are identical or substantially identical (note, as an aside, that the checksum procedure used here is, strictly speaking, not required—it is simply a computationally efficient means to quickly make a first pass comparison among a large number of provisions. It would be possible to make direct comparisons without using checksums first but it would be a more time consuming approach.

The anticipated procedure is best explained by an example. Suppose that many sample documents of a particular kind are analyzed by the System, and of the many hundreds of provisions it processes it recognized 20 different provisions with a checksum value in range of 400 through 420. The System thus separately analyzes this group of provisions in this checksum range and calculates all the similarities among this group using the more precise similarity formula and procedures discussed above. It starts with one particular provision (perhaps the one with the most common or representative checksum in the range) and, using the redlining and similarity formula approach discussed above, calculates its similarity to all the other provisions in the checksum range. For other provisions which are identical, the similarity formula should give a result of 1.0. For other provisions which are very close to identical, the formula should give a result close to 1.0, such as 0.99 or 0.98. It is anticipated that the System would have an adjustable threshold to make the determination whether provisions are sufficiently similar to be considered identical. For example, a cut-off of 0.97 might be used, and then all provisions with a calculated similarity of 0.97 or higher would be considered identical for purposes of this analysis. Of course, a value of 1.0 could also be used and then no discrepancies at all would be acceptable for purposes of this analysis.

Let us suppose that on the first pass of this analysis that, on comparing the first provision to the others in this overall group of 20, the System decides that eight of the other provisions are identical to the first one. Then there would be a total of nine (i.e. the eight identified and the original provision used for comparison) that would be considered identical. These identical provisions would be separated out from the overall group of 20 and identified as examples of a "Core Provision." Likely the single most representative example of the nine (perhaps the one then calculated to be most similar to all the others, or the one with the most typical or average checksum) would be identified formally as the official version of the text of this "Core Provision."

The process would then be repeated on the remaining 12 provisions. Perhaps, by way of example, two more clusters of 4 provisions and 3 provisions, respectively, would be identified as other Core Provisions. That would ultimately result in 5 isolated provisions that are not identical to any others, and three distinct Core Provisions.

e. Identifying the Kind of Core Provisions. Once Core Provisions have been recognized, and their text identified and stored within the System, the Core Provisions need to be categorized into their type and sub-type. In other words, once the text of a Core Provision has been established, the "kind" of Core Provision needs to be determined (i.e. it's type and sub-type). This categorization of Core Provisions into different kinds will be useful to the attorney users of the System, as will later become even more apparent.

Determining the type of the Core Provision can be greatly assisted by the caption or title of the provision. Generally the caption of a potential Core Provision would be "stripped out" in the context of trying to identify common provisions that make up a Core Provision (much as unique client names would be replaced by generic alternatives). This is done to make the provisions more uniform and facilitate their comparison. However, despite that fact that the information is stripped away for purposes of this internal analysis, it can still be retained separately, such as in a text array corresponding to the provision. For example, in the sample Section 10.1 identified above, the caption "Inventory Management" would be stripped away, but retained in connection with the text as the corresponding caption.

Once certain provisions are identified as Core Provisions, their corresponding captions can be compared. It is likely that these caption will be identical, or nearly so. The most common or representative version of the caption can thus be chosen as an initial default estimate of the type of provision. An initial default estimate of the sub-type can simply be a generic heading, such as "general."

Once these initial estimates for the type and sub-type have been made, refinements are possible. The nature of these refinements will be discussed in greater detail in related contexts later herein, but briefly, they are (i) seeking user input to confirm or revise the initial type and sub-type estimate; and (ii) comparisons against other existing Core Provisions, either within the Provision Database for this kind of document or even in other Provision Databases, in order to provide more precise estimates of type and sub-type.

f. Properties of Core Provisions.

Once Core Provisions have been identified, and categorized into their kind (i.e. their type and sub-type) then, in order to maximize their usefulness as part of the System, certain attributes or properties of such Core Provisions must be identified.

As will become clearer from further discussion herein, three of the most important properties of a Core Provision are: (i) checksum; (ii) length and (iii) favorability. Indeed, length and favorability are central aspects of a Core Provision. Functionality to search through Core Provisions based on length and favorability, in order to edit a document's provisions to match the desired Core Provisions, is set forth in FIG. 1 as arrow button control complex 100.

Checksum calculation for a Core Provision is a straightforward matter. It is computed as checksums have previously described, i.e. a weighted sum of all the characters in the text of a Core Provision.

Length is also a straightforward matter. It is a simple matter for the System to calculate the overall length of the text string making up a Core Provision and record this information.

Favorability require more analysis. The concept underlying this property is that certain provisions are more favorable to the client than others. In order to make provisions subject to analysis and retrieval based on favorability, a number representing the provision's favorability (as measured when contained in the applicable kind of document) needs to be recorded for the each Core Provision. While any numerical scale could be used, it is anticipated that a traditional scale along the lines of "1-10" would be the most natural. More specifically, a ranking of "10" would be the most favorable a provision of a given type and sub-type could be, within the applicable kind of document. A ranking of "0" would be neutral. And a ranking of "–10" would be the most unfavorable a provision could be.

However, assigning such a number can be a somewhat subjective decision and it would be quite challenging for a typical software program to make this assessment. Accordingly, a number of different techniques would be useful in this context. Four such techniques are anticipated:

(1) User Input of Favorability Number. The most useful one is the most direct: the System requests user input as to a Core Provision's favorability. By requesting attorneys that are using the System provide the favorability number, the System obtains the value of the experience of the attorneys. Furthermore, the information, as it later appears in other uses of the System, will be consistent with the expectations of the user attorneys since it originated with them.

Note that the System needs to be able to accommodate usage by multiple attorneys within a law firm. To the extent that the attorneys share common databases, means would be provided to control which attorneys are enabled to input information into the Provision Databases (for example, only partners might be enabled to input the information, but not law firm associates). Alternatively, a weighting scheme would be available which accords different weight to information provided by user attorneys depending on their seniority. For example, information as to a given Core Provision's favorability number from a eighth year associate at a law firm would likely be weighted as four times more important than that input by a second year associate. Then the actual favorability used by the System under this approach would be the weighted average of all the input information.

(2) User Rankings to Derive Favorability Number. Another technique involves user input of relative rankings among provisions, but not an actual number input.

The reason this is distinct from the first approach is that it can be difficult for attorneys to assign a quantitative measure to the favorability of a Core Provision. For example, suppose a Core Provision states "Client shall have no liability for any claims or damages arising from this agreement, except to the extent Client infringes a third party's intellectual property rights." This is a broad disclaimer of liability with the exception of if the Client infringes a third party's rights. This is clearly a very favorable provision. The question is, what number should be assigned to this favorability? Is it 8 out of 10? 9 out of 10? 9.5?

A way to deal with this is to allow attorneys to rank provisions in their relative order of favorability. In other words, the System would present the attorneys with multiple provisions of the same type, or perhaps same type and sub-type. The attorneys would then indicate whether they are favorable or unfavorable, and also rank them in order of favorability (or unfavorability).

Once ranked, a numerical value could be assigned. For example, suppose there are a total of N=30 provisions being ranked, all of which are indicated by the users of the System as favorable provisions. A quick algorithm to convert this ranking into a numerical favorability value would be a simple linear formula, where n is the number of the provision (n=1 being least favorable and n=N being the most favorable):

$$\text{Favorability}=10*(n/(N+1))$$

Thus, for n=1 and N=30, the Favorability would be quite small, 10*(1/31) or about 0.3. For n=30, the Favorability would be quite high, about 9.7. The use of N+1 in the denominator prevents an exact Favorability of 10 even for the most favorably ranked provision, so there is opportunity in the future to insert even more Favorable provisions. This can also be accomplished by a periodic readjustment of the Favorability values of existing provisions from time to time as more provisions are analyzed and added to the database.

Note that the linear formula presented above is just one possible formula. A more sophisticated, and somewhat smoother formula, would involve a switching type function such as:

$$\text{Favorability}=10*(\tfrac{1}{2}+\tfrac{1}{2}*\tan h((A)*(n-N/2)/N))$$

Here tan h is the hyperbolic tangent function and A is a constant chosen to adjust for the desired sensitivity of the resulting favorability to the actual ranking.

Finally, it is worth noting that this ranking procedure does not require all the provisions that are being assigned favorability to be of unknown favorability. To the extent that an attorney user is inputting favorability for an new provision where there are already many other Core Provisions of the same kind, the existing Core Provisions can be displayed, ranked in order of favorability. Then the attorney user can indicate where in this ranking the new provision should be "inserted." It's favorability can then be set to the average of the favorability of the Core Provisions immediately ranked above and below the newly "inserted" provision. Functionality would also be provided to allow the user to "renormalize" the favorability to a more uniform spacing, to the extent that the provisions' favorability numbers become too closely spaced in one area of values and too dispersed in another.

(3) Comparison to Other Provisions and Other Databases. It is likely that at the time that a provision is being analyzed to determine its favorability, that other, similar provisions will already have been so analyzed by the System. Perhaps these other provisions are of the same type and sub-type of the provisions at issue, but for a different kind of Document (i.e. in a different Provision Database corresponding to a different kind of Document). Or perhaps the other provisions are for the same kind of Document but of a different sub-type. In any event, to the extent that such other provisions are similar to the provisions with unknown favorability, the favorability of the known, similar provisions could serve as a rough estimate of the unknown provisions. Similarity in this instance could be determined in the same manner as previously discussed, e.g. initial comparisons with checksums and then later application of a more precise similarity formula.

Note that this use of other provisions can be use a weighted average procedure. The weight would be along the lines of the similarity of the provisions. However, a simple direct usage of similarity as a may be improved upon with some adjustment. Consider that if something is truly 100% similar then we should therefore know the favorability answer exactly. Thus, to give extra impact to the higher weights, rather than using a linear weighting scheme other alternatives might be used. An example of such an approach would a weighting equal to a square of the similarity (subject, of course, to an appropriate overall normalization factor).

(4) Dictionary. As will be further discussed later herein, another feature of the preferred embodiment of the System is "Dictionary" files essentially containing information for a listing of all known sentences, phrases and words. To the extent that such Dictionary files contain favorability information on text contained in a provision to be evaluated, this information can be used to provide rough estimates of favorability of provisions. More specifically, a rough estimate of favorability of a provision can be obtained by an average of the favorability of the sentences making up a provision (at least to the extent that such information is available). Such an approach is further described in somewhat more detail later herein (see Section C.11).

(5) Combined Usage of Techniques. It is possible to draw upon all the four foregoing approaches to favorability to arrive at an overall estimate of favorability for a provision in question. While a simple averaging procedure might be used (i.e. the average value of the four different results obtained from the techniques above) the System could provide options as to the preferred technique(s) that could be adjusted by the user (e.g. perhaps some techniques should be weighted more than others). Furthermore, some techniques could be used solely when one or more other preferred techniques are unavailable. This is most likely to occur in the context of a law firm preferring that the favorability of provisions is determined by input or ranking from its attorneys, but if there is time pressure to quickly analyze a large group of new kinds of documents, or the firm merely wants to begin the process of building up information in a certain Provision Database, favorability estimates arising solely from the System could be relied upon (i.e. solely from comparison to other known Provisions or from information contained in the System's "Dictionaries.").

g. Other Applications of Provisions. As has been previously noted, means would be provided as part of the System to allow for users to directly enter certain provisions as Core Provisions. This process would allow for a knowledgeable user to provide sample text to the System, along with its properties as applicable, without the need for the System to analyze many sample documents to arrive at the identification of the Core Provision on its own. This functionality allows for greater flexibility in usage of the System.

Furthermore, certain provisions that are not deemed to be "Core Provisions" may nevertheless be added to the applicable Provision Database, or to the Dictionary files, as appropriate. This would typically be done for a provision that the System has seen once or twice. The value of this approach is that in future analyses the System may see further examples of the provision, and then its status would be elevated to that of a Core Provision. These provisions may thus also provide useful enhancement to the overall information stored within the System in terms of recognizing other provisions that it encounters in brand new documents.

Finally, it should be noted that it is likely that a number of provisions in a given document being edited by an attorney user would not ultimately be edited to match Core Provisions. Nonetheless, they can be identified by the user or the System as provisions with distinct attributes. For example, a provision could be analyzed by the System and identified as similar to a given Core Provision. The analyzed provision would thus be estimated being of the same type and sub-type, and favorability, of the most similar Core Provision. The length of the analyzed provision, of course, would be the actual length of the such provision. Even if the analyzed provision is not edited, still it is thus identified internally by the system and may be used for any other applicable System functionality. Furthermore, if the attorney user disagrees with this estimate, he can manually change the properties corresponding to the analyzed provision (other than its length) and the System will store and rely on those properties for use in its analysis of the document.

5. COMPONENT #5: The Document View of the GUI.

COMPONENT #5—Component #5 of the System is the Document View of the Graphical User Interface, or "GUI." While the GUI itself has been discussed previously as Component #3 of the System, it was also mentioned that the subcomponent of the GUI, the Document View, merits separate discussion as a separate component. This is partly because the Document View helps to demonstrates how many of the concepts underlying the System come together and interact in a useful manner. It is also because this is where a user will spend most of his time operating the System, i.e. this is where most of the "work" by the attorney using the System takes place. A sample document view is shown in FIG. 1.

a. Recognition Functionality: Finding the Closest Matching Core Provision. The operation of Component #5 is best demonstrated by an example. Suppose the following provision was previously identified by the System as a Core Provision of the kind "Supplier Inventory Commitment/Current Rotating Inventory" for the document kind "Purchase Agreement/Manufacturer Purchase from Supplier" (i.e. stored in the applicable Core Provision Database for this Kind of Document):

Inventory Management. During the Term, AdverseParty1 shall keep in stock a committed quantity of Parts that, at no time shall be less than the quantity of Parts ordered by ClientParty1 over the prior thirty (30) days. At all times AdverseParty1 shall ensure that such quantity will be sufficient to meet ClientParty1's orders as forecasted by ClientParty1. Inventory shall be maintained on a rotating basis (first in-first out) and no Parts shall be delivered from inventory that are older than six (6) months unless instructed by ClientParty1. As the above inventory is shipped to ClientParty1, additional Parts shall immediately replace them in inventory.

Now further suppose that the System is used to analyze a brand new agreement between a law firm's client, the computer manufacturer CompuCo, and one of its parts suppliers, Part Maker, also of the kind "Purchase Agreement/Manufacturer Purchase from Supplier", which has the following provision in it:

10.1 Inventory Management. During the Term, Part Maker shall keep in stock a committed quantity of Parts that, at no time shall be less than the quantity of Parts ordered by CompuCo over the prior thirty (30) days. At all times CompuCo shall ensure that such quantity will be sufficient to meet PartsCo's orders as forecasted by PartsCo.

The presence of this provision within the document is shown as 120 in FIG. 1.

When the System first opens the agreement containing Section 10.1 in the Document View it will, if it has not already done so, apply its recognition functionality to the document. At that point in time, through its recognition functionality, it is likely to recognize the above provision 10.1 as a possible variant of the Core Provision set forth above.

In other words, the System will apply recognition functionality to each new document it analyzes to recognize the most similar Core Provision to each provision it encounters in a new document. The System can do this when it opens up a new document for editing in the Document View or the process can be triggered by the "Analyze Document for Core Provisions" function of the Project View shown in FIG. 3.

This recognition can proceed in a number of different fashions, but the general approach is to use an initial comparison of provisions in a document to potential Core Provisions based on checksums for the provision as a whole. This is essentially the same process described previously for the identification of Core Provisions previously describe, except here used to identify the single best matching Core Provision in the applicable Provision Database to the provision being analyzed in the document at hand. As before, an initial usage of a checksum would be followed up by a more precise similarity calculation.

However, it should be noted that while checksums and similarity calculations will be appropriate for identifying potential Core Provisions where are small deviations, in this particular example two sentences are missing and it is possible that an overall checksum would not be useful. In that case, the "Dictionary" of sentences (to be discussed more fully later herein) would have checksums for individual sentences. The close match between these sentence checksums (and any desired more precise similarity calculation) would then indicate that the Core Provision set forth above is relevant.

Furthermore, this analysis would help identify the likely type and sub-type of the analyzed provision. To the extent that several potential Core Provisions are identified as good matches for the analyzed provision in the document, it is likely they would all be of the same type and sub-type, suggesting that the analyzed provision is of that type and sub-type as well.

Other analysis techniques to determine the type and sub-type of the analyzed provision are also available for use where necessary. Just as before, input from attorney users, and Dictionary file information (such as information not only regarding sentences but even keywords) are all available for use, depending on the option settings of the System.

It is important to realize that this recognition functionality is central to the operation of the System. Any brand new document, never before seen by the System can be presented to the System and analyzed. A recognition process involving checksum matching and similarity formula application, applied to each provision of the document (or its constituent sentences, if applicable) allows for matching to the most similar Core Provisions that the System stored in its applicable Provision Database. This allows for implementing suggested edits to the new document in a rapid and accurate manner that was never before available.

Once the most similar Core Provision (and likely type/and sub-type of the analyzed provision) is determined, this most similar Core Provision is displayed to the user as, for example, matching Core Provision 110 in FIG. 1. It is displayed as a "suggested Core Provision." Display 130 shows the difference between the analyzed provision and the Core Provision in redline format and push button control 140 allows for the attorney user to implement the revision to the document to revise the analyzed provision 120 to match the suggested Core Provision 110.

Note that there are many possible reasons that the attorney user might want a specific analyzed provision in a document to match the Core Provision. First of all, the analyzed provision is non-standard. We know this to be the case in the example in FIG. 1 since the System has already conducted a "survey" of the documents of this kind, and the most similar Core Provision does not have the sentences missing which are missing in the analyzed provision. Thus, a change in the provision makes the provision more standard. There are inherent advantages to using standard provisions, in that they are better understood by attorneys and courts.

Furthermore, the redline in 130 of FIG. 1 shows that since the missing sentences which benefit the client are standard, this provides an excellent argument that they should be included when negotiating with opposing counsel. And, of course, to the extent that the attorney user didn't realize that the sentences should have been added, this suggestion by the System is clearly very helpful.

b. Choosing a Different Core Provision. An attorney user might not want to use the specific Core Provision suggested by the System's recognition functionality. Perhaps he is concerned that the edits are too extensive (i.e. too long) or not sufficiently favorable. Or perhaps he is concerned that they are too favorable, and opposing counsel would find them objectionable or too aggressive. In any event, the System provides means through arrow control complex 100 to choose other Core Provisions by their: (i) length and (ii) favorability.

The attorney user can thus effectively edit any selected provision in the document being analyzed to revise it to match a standard provision (i.e. one that has been vetted through usage as a Core Provision) and can choose how lengthy and favorable he wants his markup to be. The Core Provisions available through the arrow control complex 100 would all be Core Provisions of the same "kind" (i.e. type/sub-type) of the provision in the document being analyzed, as these should be the most relevant provisions for review.

Arrow control complex 100 is thus a very powerful feature. A standard part of an attorney's day can involve "marking up" documents. Sometimes this is done by hand, where an attorney writes his changes on a hardcopy document and then passes off his markup to his secretary to make the change in the electronic version of the document. Or, when his changes are not sufficiently clear or complete for a secretary (i.e. he uses shorthand references such as, "make this provision more favorable") he has to hand it off to yet another, more junior attorney to actually make the edits. The process is time consuming, and can often be a stressful and exhausting late night experience, fraught with the possibility of mistakes and accidental omissions.

The System, as presented herein, dramatically improves this situation. The chances of mistake or omission plummets. The speed with which a markup can occur soars. With just a few mouse clicks an attorney can "turn" an entire document, accomplishing in minutes what could otherwise take hours. The resulting marked up document is also an improved work product, as it reflects not just the expertise of the attorney, but the vast knowledge base of the System, acquired through the "survey" analysis of many similar documents.

c. Other Aspects of the Document View. For completeness, it is worthwhile to address the other aspects of the Document View of the System presented in FIG. 1.

(i) As shown in 150, the left hand side of the screen shows the full text of the agreement, which the user can scroll through using scroll bar 160. The current provision that is subject to editing is highlighted (here provision 120). Button controls set forth in column 170, the column just to the right of the text of the agreement, allows the user to break up provisions into smaller ones, or merge them into bigger ones, using the fifth, sixth and seventh control buttons (i.e. the ability to join provisions with others above and below, or break provisions into smaller sub-provisions).

(ii) As previously indicated, the arrow buttons included within the arrow control button complex 100 allow the user to change the favorability and length of the provisions, choosing among the various available Core Provisions that are the same type and sub-type of the analyzed provision. In addition, if at any point the attorney user wants to return to the initial suggested Core Provision, he can depress the central circular button 180 which acts as a "reset" button in the middle of the arrows.

(iii) Once an attorney is done editing a particular provision, he can jump to the next one with the go to next provision button, or go back with the go back to previous provision button, using the third and fourth button controls in column 170.

(iv) Undo and redo buttons are provided as the first and second buttons of the column 170. These assist the attorney in recovering from a mistaken edit or other action.

(v) The "Browse" button 190 provides a more direct (although more involved) way to access different Core Provisions of different types/sub-types, in case this would be helpful to the attorney user. This allows for the possibility of even more significant edits to a document.

(vi) Certain "statistical" information is also accessible. For example, the similarity of the core provision to the actual provision is presented (calculated in the manner previously discussed) in the information list 200. Correlation information regarding the frequency of the inclusion of certain provisions, when compared to other included or omitted provisions, can be displayed through button control 210.

(vii) There is no requirement for a user to actually change the selected provision to identically match a Core Provision. Instead, the system merely records internally what is the most similar Core Provision to the analyzed text while the analyzed text is still retained in the document. Further, a user can simply edit the selected provision as desired by typing directly in the text 120 included within column 150.

d. Selecting Core Provisions on the Basis of Length and Favorability.

As previously indicated, arrow control button complex 180 of FIG. 1 may be used to select different suggested Core Provisions (all of a given type and sub-type) based upon their length and favorability. Some further discussion regarding this point may be helpful.

Arrow button complex 180 presents length and favorability to the user as if they were essentially set forth in a rectangular grid or matrix. The right/left arrow buttons suggest moving back and forth on a horizontal x axis and the up/down arrow buttons suggest moving back and forth on a vertical y axis.

It should be noted that the various Core Provisions are not, at least initially, actually laid out on such a grid for these properties. However, they can be arranged as such, at least internally. More specifically, for a given kind of document, and the kind of Core Provision then being suggested, there will be a certain number of Core Provisions available and they can be ranked sequentially in two separate one dimensional arrays, where one array is ordered by length and the other array is ordered by favorability (each of these two, called a "Separately Ranked Array"). Then if the user wishes to adjust favorability, the current Core Provision would be located in the one dimensional favorability array and the favorability arrow controls would change the selection, moving back and forth the favorability ordered array as applicable. Similarly, there would be a one dimensional array of the available Core Provisions sequentially sorted by length. If a user wants to change the length of the suggested Core Provision, the current suggested Core Provision would be located within this array and the arrow controls would allow the user to move up and down through this ordered array, changing the selected provision to shorter or longer suggested text samples as desired.

Depending on user option settings within the program, the foregoing is a perfectly acceptable approach to allow a user to search through the different suggested sample text versions of a given kind of Core Provision. There is, however, a drawback to this approach. When a user is searching through one property, the other property may be highly variable in an undesired manner. For example, a given Core Provision might be displayed with a length of 101 characters and a favorability of +8.1. The attorney user might decide that a slightly shorter provision would be desirable. So on pressing the down arrow key to see a different and shorter sample text the System might display another Core Provision with a length of 95 but a favorability of −3.2. This is likely not what the attorney user had in mind. Instead, what was probably desired was a provision that was shorter but still somewhat similar in terms of favorability. A similar problem can result in changing favorability, i.e. changes in favorability can result in substantial changes in length as each choice is displayed.

There are a number of ways to address this issue, although they all have strengths and weaknesses.

1. Allow for variation. The most direct approach is to simply ignore the problem—a user can continue depressing the arrow controls and it is likely that a more suitable combination of favorability and length will appear within a reasonable time.

2. Weighted ordering. Another approach is to show flexibility on the notion that pressing an arrow control to increase a given property (i.e. length or favorability) always increases that property in every instance (until, of course, the maximum value is reached). Instead, one can allow for a situation where pressing the control generally increases (or generally decreases) the desired property, but does not do so in every instance. This situation would result from using a weighted combination of the Separately Ranked Arrays to create new weighted arrays that are generally sequentially ranked in one property but also take into account similarity in the other properties. Thus, there would be a tradeoff: not every press of the arrow control to increase a parameter would result in an increase, but the other parameters are less likely to widely vary in the process. The exact weighting parameter that mathematically represents this tradeoff could be an optional setting in the System.

As an example for purposes of clarity, suppose for a given kind of Core Provision, for a given kind of Document, there are 20 different sample Core Provisions (i.e. 20 different text paragraphs) and that the weighting parameter is 0.25. To create the new weighted one dimensional array for favorability, each Core Provision is assigned a number based on (1−0.25), or 0.75, for the Separately Ranked Array for favorability and 0.25 for the Separately Ranked Array for length. Thus, if Core Provision #13 is ranked 4 for favorability and 11 for length, it's new weight is 0.75*4+0.25*11=5.75. This process continues for all the Core Provisions. Then, they are re-ranked, i.e. reordered, based on these numbers into a new weighted favorability array. This new favorability array is thus mostly (i.e. 75%) ranked by favorability, but is also somewhat (i.e. 25%) ranked by length. This creates the effect of a tendency towards grouping together Core Provisions by their length. Thus, when the arrow key is depressed to increase favorability, it is more likely that a similar length provision would be presented as an alternative, although it is less certain (as a tradeoff) that the new provision will in fact actually be more favorable. The extent of this tradeoff is represented by the parameter. For a small parameter, near 0, the ranking of the favorability arrays is based nearly entirely on favorability. As the parameter increases the impact of length is increased. It is likely that the parameter should be kept below 0.5, as at that point the rankings of favorability and length are equally weighted and the distinction between the two rankings loses meaning.

3. Continuous Two Dimensional Space. Another means by which to address the issue is to actually establish an internal two dimensional space of favorability and length, much as the arrow controls suggests exists conceptually. Again, such a choice could be available as an optional setting within the System (i.e. the user could select one-dimensional arrays, weighted arrays, 2D space, etc. . . . )

There are certain trade-offs involving this use of a two-dimensional space as well. As an initial matter, the most straightforward way to create such an area in space is to look at the available sample text Core Provisions and scale one "axis" to create a roughly "square" distribution of the points. This is necessary because if an area of two dimensional space is established with favorability of a provision as the x parameter and its length as the y parameter, it is not otherwise clear how one would calculate a "distance" between two provisions in this two dimensional space. Since favorability and length are two dissimilar parameters, without such a scaling the traditional distance formula of $sqrt(x^2+y^2)$ is not meaningful since x and y are in different units. This can be solved by scaling the units into common dimensionless numbers. For example, the difference between the largest and smallest favorability values can be computed and then each favorability value can be expressed as a percentage of such range. Similarly, each length can be expressed as a percentage of the range of the difference between the largest and smallest available lengths. This new dimensionless set of x and y coordinates for the available provisions thus allows a distance in this two dimensional space to be computed with length and favorability on an equivalent basis.

Once distance can be computed it can be used to allow the arrow keys to "move" in this two dimensional space by changing from the current selected Core Provision to the next Core Provision which is greater (or smaller) in a given property when the increase (or decrease) arrow control is depressed by choosing the Core Provision which is greater (or smaller) in the desired property that is the "closest" distance.

Note that even with this approach there are trade-offs and choices. In particular, if a user presses the arrow key to increase favorability and the closest other Core Provision is selected, there is a question of what happens if the user changes his mind and presses the arrow key to decrease favorability. The user expects that the prior displayed Core Provision will once again appear. However, this may not always be the case. Perhaps once the new Core Provision is "current" there will be another Core Provision which is smaller in favorability but is closer to the new Core Provision than the prior one. Furthermore, if the System is adjusted so that each Core Provision has a one to one correspondence with each other Core Provision, to form a type of net in which actions can be "reversible" by depressing the arrow key which is opposite in direction to the most recently depressed arrow key, it is not clear that every available Core Provision could be included in such a net. Thus, if the user chooses to use a two-dimensional space approach towards the arrow keys, the user may have to decide through an option setting which is more important: the ability to reverse an arrow control with the opposing arrow control or the ability to access every available version of the applicable kind of Core Provision.

4. Discrete Two-Dimensional Grid.

As another possible approach, a two-dimensional grid can be established made up of discrete values of favorability and length. For convenience, favorability is chosen as the x axis, and length as the y. Favorability is broken up into a certain resolution, which could be chosen, for example, 0.1. So the x axis ranges from −10.0 to +10.0 in increments of 0.1. Length is discrete, from 1 to the maximum length that is applicable.

In order to assign Core Provisions to a specific favorability value, the actual favorability number for each Core Provision is, for these purposes, rounded to the nearest 0.1. To the extent there are multiple Core Provisions of the same ranking after such rounding, they are ranked in order of most closely matching the given grid value. For example Core Provisions of favorability 7.12 and 7.14 are each treated as 7.1, but 7.12 is ranked #1 and 7.14 is ranked number two.

Figure 5:
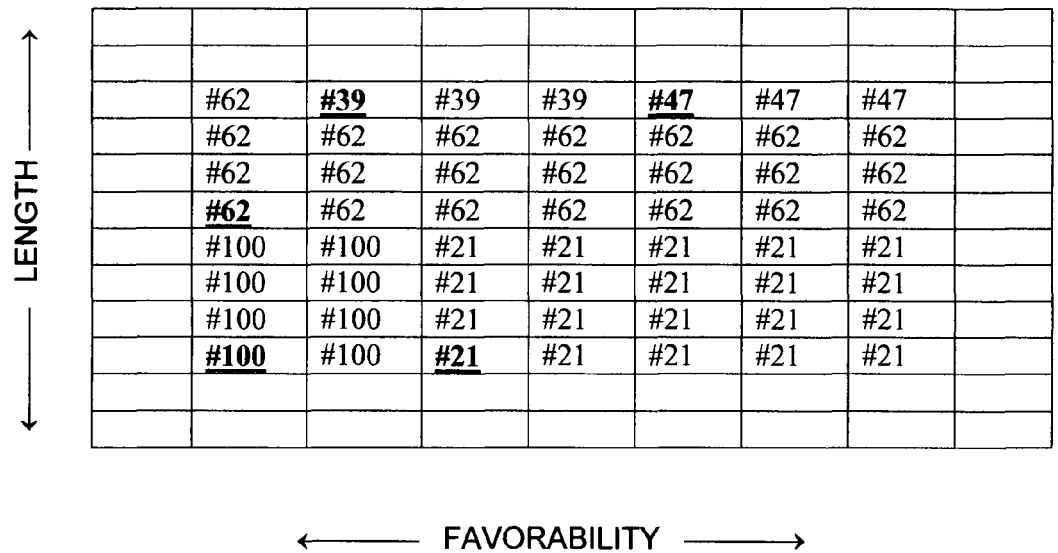
FIG. 5 shows one possible means of organizing specific Core Provisions, indicated by Core Provision identification numbers, in a grid-like fashion based on their length and favorability.

Core Provisions of a given kind, for a given kind of document, are then mapped on the grid, with the appropriate grid square for each such Core Provision "filled in." In other words, for a given Core Provision (identified as, say, Core Provision #100) of favorability 7.2 and length 91, the grid box with the coordinates x=7.2, y=91 is filled in. This process is repeated for each available Core Provision of the given kind. A general illustrative example of the grid described above is set forth in FIG. 5. Core Provision numbers are indicated in that grid of FIG. 5, and the initial assignment of a grid box to a particular Core Provision number is indicated with an underline and bold faced font.

Next, a boundary area is set, consisting of a rectangular region of the lowest and highest x value, and the lowest and highest y value.

Then, for each y value which has x values in it, the x values to the right of each filled in grid point is also filled in with the applicable core provision. In other words, each row (determined by a given y value) is filled in or "painted" to the right with each grid point that has a provision, except that the "painting" process is trumped when it encounters a new grid point that already has a value assigned.

In the example above, the grid of x=7.2, y=91, would fill in x=7.3, y=91 with Core Provision #100. It would then fill in x=7.4, y=91 with Core Provision 100. It would continue on until, for example, it hit a grid of x=8.1, y=91 which already had a Core Provision assigned to it such as, for example, Core Provision #21. Then the process would continue, x=8.2, y=91 would be filled in with Core Provision #21, as would x=8.3, y=91, etc. . . . until a new assigned grid point was encountered, or all the y=91 values were filled in until the boundary was reached.

This process would then occur in the y direction. Each filled segment of a given row, say y=91, would "fill" the rows above it, unless the grid values in the row have already been assigned. If the entire row y=92 were empty, then y=92 would be a copy of the current row y=91. If part of y=92 already had assigned grid values then those would trump the painting from below, and only part of row y=91 would be copied (i.e. only the part that would be copied onto the unassigned portion of row y=92). Then this new row y=92, consisting partially of a copy of y=91 and partially assigned grid values unique to y=92, would then be copied to row y=93 (subject to, of course, any grid values already assigned to it). This process would ultimately stop once the upper boundary was reached.

This process of assigning grid values, then copying to the right, and then copying upward, fills in the whole boundary defined area. If there are any lower portions, or portions towards the left side of the boundary area that remain unassigned, the final step of the process would be to copy existing values in assigned areas to the left, and then downward (i.e. the reverse of the standard, but just in this one instance to complete the "filling" of the rectangular boundary area).

Once this process is complete, there is now a two-dimensional grid of Core Provisions organized by favorability and length. When a document is being analyzed, and a Core Provisions is suggested, the corresponding grid segment is internally noted. If the attorney wants to adjust the favorability up or down, or the length up or down, the System searches along the grid in the direction of the desired axis until a new Core Provision selection is available for display (or the boundary is reached and no further movement in that direction is immediately possible). Once the search enters into new "territory" where a different Core Provision number has been assigned, then that becomes the new suggested Core Provision. Furthermore, the current grid position is then slightly adjusted once more, to match the "native" grid point, i.e. the grid point where the Core Provision was initially assigned, not merely filled in.

For example, suppose x=7.2, y=91 is the current suggested Core Provision (say, Core Provision #100). If in the process of increasing length (i.e. moving up the y axis), a new Core Provision "territory" is encountered at x=7.2, y=105, which is the territory of Core Provision of provision #62. Suppose further, that Core Provision #62 actually has a favorability of 6.9 and a length of 105, but the 7.2, 105 grid point was in the "territory" of #62 because that area had been "filled in." Then, when the attorney user presses the up arrow to increase length, the grid will be searched up the y axis until grid 7.2, 105, Core Provision #62 will be identified as a new choice, and Core Provision #62 will be displayed as an alternative. In addition, the current grid "location" will then be reset to 6.9, 105 to correspond to the initial value of Core Provision #62. The fact that territory encountered at 7.2, 105 was the trigger for the change no longer matters—the new current location moves to correspond to the actual values for Core Provision #62.

Finally, note that the grid based approach allows for further Core Provisions to later be added to the grid. The process would be similar to that described above for initially filling the grid. A new Core Provision is assigned to a specific grid point as its point. It then "paints" to the right until a different native grid point is encountered. This segment then "paints" upward to the extent that it would have painted upwards for blank grid points (i.e. it supersedes the assignment of grid points to the same extent that it would have if it had been initially included). Or, to put it another way, the result is similar to if this new Core Provision had been included in the first place. In fact when adding a new Core Provision, as an alternative the entire grid can be regenerated (since such additions are infrequent and the computational resources for such a regeneration are not significant).

It should be noted that this grid based approach helps to control the ability to adjust favorability and length in an organized and coherent fashion, but the "reversibility" aspect may be lacking.

5. Lack of Full Control.

It is important to note what all these approaches for selecting a Core Provision based on length and favorability do not provide. They do not provide total control to a an attorney to specify the exact Core Provision desired. In other words, if an attorney remembers a Core Provision from a prior agreement or prior work with the System, this means of searching based on favorability and length is not the ideal method to find such Core Provision. However, some implementation of this approach, dependent upon the user options settings, is nevertheless likely to be the preferred embodiment of the System. This further distinguishes the System from the prior art. The System is not focused on recall of specific desired provisions. It is about providing attorneys with the ability to quickly and accurately make quality markups of documents, with control over how lengthy and how aggressive they wish the markup to be. The fact that a specific Core Provision is not immediately accessible in this fashion is consistent with this approach.

What matters is the quality of the overall markup, not the ability to precisely replicate the specific text that initially comes to mind when an attorney reviews a document. To the extent that such an ability to browse through all available Core Provisions in a comprehensive fashion is desired, it can be provided, but it is not necessary to be provided in this fashion for the standard usage of the System.

Also, note that it may be possible to combine the various approaches simultaneously through the use of additional controls. For example, an arrow control button might be broken up into an inner arrow symbol and an outer arrow symbol. The outer arrow symbol could provide a weighted array approach, whereas the inner array could simply be the standard separately ranked array approach for precise control over a specific desired property.

6. COMPONENT #6: Dictionary

Component #6 of the System is a set of one or more "dictionary" files. These are files that include general information about text or document patterns and properties seen by the System. They are referenced in row 3 of FIG. 2.

One key distinguishing feature between the dictionary files and any other files discussed herein, such as those in particular databases, is that they are generally "global" in nature, pertaining to every kind of information the System has "seen."

In other words, files within a Core Provision Database correspond to just that database, which corresponds to just that particular type and sub-type of document. The information in one Core Provision database usually has no meaningful interaction with any other Core Provision database. It is not "global" information, rather it is carefully separated and organized by the specific kind of document, i.e. a higher hierarchical organizational level.

This is not the case with dictionary files. For example, the dictionary files might have information that a particular sentence, such as "Licensor shall control the defense of any such claim or action" is present in certain kinds of documents, and certain kinds of Core Provisions within such documents. This information then assists in categorizing the larger provision being analyzed which contains the sentence. Not only can this assist in identifying the type of document and Core Provision, but if no matching text of a Core Provision is found it can nevertheless allow the System to suggest a proposed "kind" of Core Provision (i.e. suggest a type and sub-type), due to the presence of this sentence.

It should be noted that Dictionary files can include information on sentences, phrases, or even words (specific words of particular importance or uniqueness can be referred to as "keywords").

Additional Features and Enhancements.

There are additional possible features and enhancements of the System which are useful aspects, but not central components. They are worthy of inclusion in the preferred embodiment of the System and are described in this Section C 1. Document Comparison.

Discussions set forth above showed one of the main uses of Core Provisions, namely they can be used to quickly and accurate edit a document so as to do a rapid "turn" of a marked up version of a document (i.e. a rapid overall document revision). However, Core Provisions have other advantages as well. One of these other advantages is to generate comparisons of apparently dissimilar documents.

In other words, by breaking down agreements into their Core Provisions (or at least into the most similar Core Provisions to the actual text) they can be more readily compared and analyzed. This can be seen by the following exercise: one could go through a given agreement, break it down by the provisions it uses and then reorder the provisions into a different sequence (with only perhaps minimal revisions to cross references). The end result might be an agreement that looks very different from the one that was started with, but still be essentially the same agreement.

Yet suppose an attorney ran an ordinary redline of this reordered document against the original version. The resulting standard redline output would be near useless. This is because the agreements are too different, at least optically, to start off with. The redline would likely simply show a deletion of all sections and the addition of all brand new sections. Or, perhaps, it would just show every single section as having been moved. In either case, the output would be uninformative.

In contrast, the System can generate a very useful comparison. By breaking up the two documents into their closest Core Provisions, the System can generate a provision by provision redline with commentary as appropriate. This comparison would show that the documents described above are essentially the same agreements as far as content goes, despite their different appearance. In other words, the present System would provide information that is both useful and correct, whereas a standard redline would not.

It is worth noting that this ability truly is useful in daily law firm practice. For example, suppose a law firm client entered into an equipment lease a few years ago, and now wants to enter into a new lease with a different lessor. The client approaches the new law firm and hands over the new lease agreement from the new lessor, and asks the firm how does this compare to the old lease? The clients wants to know which aspects are better, and which are worse.

If the document sections of the new lease are not in the same order as the old lease then the law firm is in for a long difficult project, checking and cross checking sections, with great opportunity for error. Typically a client will be eager for a quick answer, despite the challenging nature of the assignment. Not only will such a tight deadline be difficult to meet, but the time constraints would also impair the quality of the work product, if, for example, the results needed to be summarized in memo form. In contrast, the System can provide a rapid analysis (with an option for generating output in memo format if desired).

An excerpt from a sample of such a System comparison output is shown in FIG. 6. Note that the System comparison includes a "favorability" analysis. Thus, in addition to the redline comparison, this allows users to line up two documents and get a general sense of which document is the most favorable and by how much.

2. Summaries and "Forms".

a. Summaries. Another advantage of breaking documents down into their Core Provisions is that it allows the System to generate useful summaries of an agreement. Furthermore, the user can choose the format of the summary and how detailed it should be.

For example, an attorney might want a summary of an agreement that just lists the names of the Core Provisions in the agreement. There could be many reasons for wanting such a list. Perhaps the attorney wants it because he has been asked to double check that all the provisions are in the agreement that are expected to be there. Perhaps the attorney wants a quick list for purposes of conducting diligence (i.e. document review) on a large number of documents. Or, perhaps an attorney wants to quickly double check the overall work product of a junior attorney he is supervising.

A Core Provision name summary of say, a software license agreement for Client X, could look like the following list of type, sub-type and word numbers:

1. License to Global Software Use/Includes Documentation (42 words)
2. Payment Terms/Standard terms for Client X (29 words)
3. Term/Standard Initial And Renewal (19 words)
4. Termination At Will/90 Days Notice—Mutual (21 words)
5. Termination For Breach/Mutual (33 words)
6. Termination For Bankruptcy/Unilateral (34 words)
7. Governing Law and Courts/New York (63 words)
8. Force Majeure/General (17 words)
9. Entire Agreement Clause/Standard (28 words)
10. Counterparts/Standard (22 words)

You can see this is a very brief, yet quite informative summary. Just looking at these few lines gives you a general idea of the provisions in the agreement, while the agreement itself would be several pages long.

Note that the number of words in parentheses are helpful tools to distinguish among various Core Provisions which might otherwise have similar or the same names. For example, the specific Core Provision of the kind "Governing Law and Courts/New York" might read, in its entirety, as follows: "The parties agree that any case or controversy arising out of this agreement should be governed by New York law, without reference to conflict of law principles. The parties hereby submit to the exclusive jurisdiction of the federal and state courts located in the County of New York, State of New York, and waive any objection under forum non conveniens or similar doctrines." Clearly this is much more of a mouthful than simply summarizing this as Core Provision Governing Law and Courts/New York (63 words).

b. Forms.

The System also includes functionality to provide a special type of linkage between designated Core Provisions, and the Core Provisions so linked are called different "Forms" of the collection of Core Provisions. Once such a linkage is established, a given Core Provision can be changed into a different "Form" of that Core Provision (i.e. the Core Provision can be changed from the current Core Provision to another Core Provision that is appropriately linked) with essentially one or two clicks of a control. The primary "change form" control is shown as control button 220 in FIG. 1. There are at least two separate reasons for wanting to establish such a linkage.

i. Term Sheets.

The first reason is to be able to create "Term Sheets."

A Term Sheet is a scaled down summary version of an agreement. It is typically relevant when parties are interested into entering into a non-binding letter of intent to proceed with a transaction. In that case the parties sign an agreement to negotiate the transaction in good faith in accordance with the summary outline versions of the provisions listed in the Term Sheet attached to the letter of intent. An example of such a outline version would be when a private equity investment is being made by investors purchasing certain shares of stock in a company and the investors state in the Term Sheet that "Standard tag-along rights will apply so long as the investors hold at least a 10% interest in the company." Tag-along rights are the rights of a shareholder to participate in a sale of stock by other stockholders. A full blown provisions setting forth the details and mechanism of such rights can be at least a paragraph long. Use of this alternative short version (i.e. a simple sentence in the term sheet) is, however, appropriate in the term sheet, since it is non-binding and a useful starting point for further negotiations.

Suppose client X approached a law firm with a term sheet and asked the firm to convert the term sheet into a full blown stock purchase agreement. This would ordinarily be a very lengthy process. However, if "Forms" are used, the process would be much quicker. Forms, in this case would involve the law firm, in advance of receipt of any term sheet establishing a linkage between the term sheet "form" of the tag-along Core Provision and a full-blown standard agreement "form" of the Core Provision. In other words, the law firm would have already used the System to conduct a survey of many sample stock purchase agreements. And it would already have conducted a survey of many sample letters of intent. In the course of each process, the System would have identified numerous different kinds of Core Provisions applicable to stock purchase agreements, and numerous different kinds of Core Provisions applicable to term sheets. And the two processes would be conducted independently. However, a law firm with foresight would have reviewed term sheets for stock purchases, and the actual full blown agreements, and would have manually established linkages for the different related provisions. In other words, it would have manually indicated, through functionality provided by the System, that the Core Provisions identified for tag-along provisions in the stock purchase agreements are "linked" to the Core Provisions identified for tag-along provisions in the term sheets as common "Forms" of the same underlying concept. In fact it would have done this for many kinds of the Core Provisions, not just tag-along rights (e.g. anti-dilution provisions, drag-along rights, rights to register securities for a public offering, etc. . . . ).

Thus, when a new term sheet comes in for review, the law firm is ready. It would run the term sheet through the System and the System would recognize the provisions as corresponding to certain term sheet Core Provisions. Then, instead of accepting any term sheet revisions through the process of making them match term sheet Core Provisions, the firm instead clicks on the "change form" control button (see 220 of FIG. 1) and would choose a full blown stock purchase agreement Core Provision. Since they were previously linked, these provisions are readily accessible through the forms button even though they correspond to different kinds of documents (e.g. stock purchase agreements as opposed to letter of intent term sheets). This process can proceed, provision by provision, so that turning the term sheet into a full blown agreement is a relatively quick and accurate process.

Note that this process can work in reverse as well. Suppose Client Y approaches the law firm and says that it would like a brand new term sheet, but based on a previously negotiated agreement for a different deal that Client Y had been involved with. Once again the law firm can load up the old agreement for analysis by the System, convert each full blown agreement's provisions into the corresponding term sheet "form" of the corresponding Core Provisions, and a term sheet is then rapidly available.

Note that it is anticipated that manual input from attorneys would likely be the most common approach to establishing the linkage between different kinds of Core Provisions to establish them as different "Forms" of the same underlying concept. However, this can be partially automated as well—in particular, when the type and sub-type of a given Core Provision is established, potential similar kinds of other Core Provisions could be offered to the attorney users as suggested linkages to establish common Forms.

ii. Mutual.

The second reason for the use of Forms is to make provisions "mutual."

One edit that attorneys frequently seek to make is to make a provision "mutual." In other words, an initial draft is received which is favorable to the opposition. Rather than simply revising the provision to favor only the attorney's client, instead a compromise can be proposed: let's make the provision mutual. For example, if a provision asserts that the client has to pay for obtaining licenses for it to conduct business, it can be changed to say that each party has to pay to obtain licenses to conduct its respective businesses. Thus, it would be helpful if the System provided a means to convert an initially proposed provision into a mutual form.

The System provides two ways to do this. The first way is to adjust the favorability of a given provision. As will be recalled, Core Provisions are assigned a favorability ranging from $-10$ (most unfavorable to the law firm's client) to $+10$ (most favorable to the client). A rating of 0 is neutral. Thus, if a user attorney edits a provision to change its favorability to a value at or near 0, it is likely that the resulting text of the new Core Provision will be mutual or effectively mutual.

Sometimes, however, it would be beneficial for an attorney to have greater certainty that a provision is being changed to an explicit mutual form. This is where "forms" are helpful. The user can use the System's functionality to establish a linkage between Core Provisions of a given kind and Core Provisions of a similar kind which include "mutual" text. For example, a Core Provision of a kind "Indemnity/IP Only" might read: "AdverseParty will indemnify, defend and hold harmless Client from any claim of infringement of third party proprietary or intellectual property arising from AdverseParty's provision of services hereunder." However, the "forms" functionality allows this kind of Core Provision to be linked to a Core Provision of kind "Indemnity/IP Only—Mutual" which reads "Each party will indemnify, defend and hold harmless the other party from any claim of infringement of third party proprietary or intellectual property arising from such party's actions in connection this Agreement." Once the linkage is established, these two different "kinds" of Core Provisions can be considered different "forms" of the same underlying concept, and an attorney user can rapidly change from one Form to another. Thus, in the course of editing a document, it would be a relatively straightforward matter for an attorney to make a provision mutual, or switch it back again.

3. Interchange Parties.

Another useful feature that can be included within the System, perhaps as an advanced option, would be the provision of means to interchange parties. In other words, instead of a provision stating "Compuco shall provide all reasonable assistance requested by Partmaker" the text would be changed to "Partmaker shall provide all reasonable assistance requested by Compuco." This is useful in situations where a draft from an adverse party is unusually aggressive and attempts to assign some obligation to a client that really should be borne by the counterparty.

4. Sub-Provisions and the Grouping Principle

One aspect of the use of Core Provisions that needs to be considered is the role of "sub-provisions." A quick way to understand how this issue might arise is to consider the following: suppose a draft of an agreement comes in with a single document section made up of two Core Provisions put together into one larger paragraph. The question then is how the System should respond to this. Should it recognize two core provisions separately? Learn about the new larger paragraph as an entirely new provision?

A simple general principle in the System's preferred approach is that it is faster and more efficient to deal with larger provisions that smaller ones, provided the larger ones can be recognized. The System can cover more ground with this technique—for example, an agreement is more easily summarized, and analyzed, with a list of 10 Core Provisions that make up this agreement instead of 300 small provisions and/or subprovisions It's simply less material to deal with. This is why the general default is to use the largest Core Provision possible in terms of recognition analysis.

However, even with this approach, the matter is not always clear cut. Consider the following example, Section 3.8, excerpted from a general service agreement:

Section 3.8. Client may request that Service Provider remove specified components from its routing network used to provide services to Client at any time and from time to time. Client shall replace such components with other components that are acceptable to Client. It is Service Provider's responsibility to ensure that at all times the components provided shall include no virus or spyware in any built in software.

There could be different points of view as to the intent of this section. For example, a reasonable summary of this section would be that the Client has the right to have components removed and replaced. However, in this reading one needs to consider the role of the last sentence in this section. It does appear at least related to the component issue, but one can fairly ask if it really belongs in this section. The idea that a network provided by a Service Provider should implement security to protect against viruses is itself a broader concept than the idea that specific network components should be removed. Indeed, this last sentence could be included in a general statement of responsibilities regarding network security, instead of here in Section 3.8, and the remaining portions of Section 3.8 could be viewed as, perhaps, addressing Client's desired for newer or more compatible components.

When surveying many sample documents, perhaps the System will see all of the foregoing combinations. So it is important to address how it responds to this situation.

In general, as stated above, the System will use the largest matching Core Provision it can find when analyzing a new document. Thus, when Section 3.8 is encountered, it will calculate a checksum for the provision, and through the use of this checksum, and subsequently more refined similarity formula calculations, it will identify the Core Provision in the appropriate Provision Database that most closely matches the analyzed text.

It is anticipated, however, that there will be an option setting that sets a minimum threshold for being considered as matching a Core Provision (perhaps approximately 90%). If there is no matching Core Provision for the paragraph as a whole, then the fall back would be to identify smaller Core Provisions within the larger paragraph.

This is accomplished through the use of the dictionary files. Each sentence is categorized separately by a checksum and by listing the Core Provisions to which it belongs. Thus, an analysis of the checksums in the analyzed provision can lead to identification of similar sentences in the dictionary files, and these dictionary files contain information on the sentences' membership in Core Provisions. An overlap among the possible Core Provisions for the various sentences indicates a possible match (i.e. a possibility that a Core Provision is present within a larger paragraph or document section), worth following up with a closer similarity calculation.

In other words, in the example above, perhaps no Core Provision is identified as a match for the paragraph as a whole. So then the sentences are analyzed and it is found that sentence #1 of the paragraph (or a sentence substantially identical) shows up in Core Provisions #69, 204 and 300, Sentence #2 shows up in #30, 204 and 299 and #3 shows up in Core Provisions #12 and #15. The overlap of Core Provision #204 for sentences #1 and #2 suggests that those two sentences are members of that Core Provision. Then a more precisely similarity analysis can verify this and the first two sentences are identified as Core Provision #204. The last sentence can then either be identified as a Core Provision on its own (perhaps Core Provision #12 or #15 is only one sentence long) or it can be marked as of unknown status.

Note that this individual sentence analysis for purpose of identifying Core Provisions that are essentially subprovisions of a larger paragraph should proceed internally when a document is analyzed by the System even if the whole paragraph is readily identified as a Core Provision on its own. This is because perhaps the attorney user may desire to break up a provision into subprovisions for later editing, or thinks that two or more sub-provisions more accurately captures the intent of the text (or enhances the ability to revise the document) than one larger Core Provision. Push button functionality to break provisions into smaller sub-provisions, or merge provisions together into a single larger provision, is provided as shown in column 170 of FIG. 1.

5. Cross References

A "cross reference" is when one provision of a document explicitly refers to another provision, typically by section number. For example, a liability limitation might initially state "Client shall not be liable for any damages in connection with this Agreement." A new version of the sentence might then be changed to state "Except as set forth in Section 8.2 hereof, Client shall not be liable for any damages in connection with this Agreement." Section 8.2 might then provide for very substantial liability exposure for the Client. This example shows that cross references can change the meaning that a provision would have in the absence of such cross reference.

Cross References might initially seem a challenge for the System to process because when they occur they interfere with the modular nature of legal documents which the System otherwise utilizes. However, although they are problematic, they usually are sparsely scattered in a document, perhaps being confined to usage in just one or two sections. This relatively limited usage is partly because the overuse of cross references, regardless of the role of the System, is inherently confusing to attorneys who read the documents. It is also because frequent use of cross references, much like frequent use of the "goto" command in a computer program, is a mark of poor drafting.

Nevertheless, cross references are often present in a document to a certain extent and it is therefore desirable for the System to separately address them. In particular, care must be taken in considering the role of Cross References in the meaning and use of Core Provisions. An example of the impact of Cross References on the use of Core Provisions can be seen in the following example. Suppose a document includes (i) a strict liability cap in Section 10 protecting the Client—perhaps the maximum damages are just $1000 for any type of claim, loss or action arising in connection with the agreement; and (ii) Section 13 which states, "Notwithstanding anything to the contrary in Section 10, each party shall bear full liability for any damages arising from a breach of this agreement." If the role of Cross References was not considered, the document could be seen in a summary listing as including Core Provisions such as (i) "Liability Cap/Broad Cap (27 words)" and (ii) "Parties Responsible/Breach Applies (24 words)". A quick read of such a summary would not show the impact of the interaction between the two Core Provisions.

The System addresses the impact of Cross References using two distinct and complementary methods:

(1) Separate Listing. The System handles Cross References by including functionality intended to separately list cross references. The foregoing example would result in a display in a summary list as follows:

Cross Reference:
  Parties Responsible/Breach Applies (24 w)
  Overrides
  Liability Cap/Broad Cap (27 w).

In addition, both listings in the summary would be marked with footnotes to indicate the presence of a cross reference that specifically references that section.

The word "overrides" describes the relationship between the two provisions. The System recognizes this relationship because the phrase "except as set forth in" is recorded in its Dictionary files as corresponding to the "Overrides" relationship. Other phrase correspondences can also be input or hardwired (for relationships such as "supplements," "cancels" or "qualifies") but a default that can be used in the absence of such more specific information is simply the word "references."

(2) Substitution. It has been previously indicated that the System may internally substitute certain generic names for certain defined terms. For example, a company named "PartMaker" is internally referenced as "AdverseParty1." This creates uniformity for analysis and application of potential Core Provisions. The substitution largely happens "behind the scenes" as far as a user of the System is concerned. In other words, when the suggested matching Core Provisions is displayed, the corresponding reference to "PartMaker" is automatically shown in place of "AdverseParty1."

This substitution approach is also very useful, in a slightly more sophisticated form, in the context of cross references. In this instance, a provision with a cross reference such as "Notwithstanding anything to the contrary in Section 10, each party shall bear full liability for any damages arising from a breach of this agreement" becomes "Notwithstanding anything to the contrary in Section {Parties Responsible/Breach Applies (24 w)}, each party shall bear full liability for any damages arising from a breach of this agreement." In other words, provided the section which is cross referenced has already been identified as a specific Core Provision, the identity of that Core Provision can be substituted. This allows for the resulting text to be analyzed just like any other Core Provision, i.e. it can even be added to a Provision Database and itself recognized as a Core Provision once the cross numbering issue has been eliminated.

There are a few caveats to the use of this approach. The primary one is that the cross referenced section needs to have already been identified by the System to make the substitution. If the cross referenced section has not formally been identified as a Core Provision, then at least it needs to have been identified as a provision either substantially similar to a Core Provision, and internally recorded as such, or recorded as another provision which is not a core provision but has specific attributes such as type and sub-type assigned. This creates a situation where the order in which provisions are analyzed is important—the cross referenced section needs to be analyzed or identified by the System before its section number reference. If it is identified later, than the System can backtrack and prompt the user to address the previous section where the reference occurred, but this is a less efficient approach.

Another caveat pertains to the display. Since the sentence with the phrase "Section {Parties Responsible/Breach Applies (24 w)}" is not going to actually appear in the final edit of the document that is distributed externally, the other visual version of this, e.g. "Section 10" must be available for display. The preferred embodiment would address this by including a "tabbed" screen in so the user can quickly switch back and forth between views.

Finally, if a substituted cross reference provision appears in the Provision Database as a Core Provision, and the user wants to edit the document to match this Core Provision, there is a risk the core provision will include substituted text to a section that is not currently in the document. In this instance functionality would be included whereby the Core Provision can be used, but the System would add into the document the missing cross referenced provision as an additional, new document section.

6. Continuous "Learning".

The analysis of a document by the System typically draws upon an existing provision database to identify the closest Core Provision. However, there may be instances where the attorney user decides that the closest Core Provision does not fully capture the meaning of an analyzed provision and that a brand new Core Provision, of a brand new type or sub-type needs to be created. Functionality would be provided in the System to allow for this. The attorney need only indicate that the text is to be added as a Core Provision, and assign a type and sub-type and favorability. The information could then be added to the appropriate Provision Database (providing the attorney user is permissioned to make changes to that database). Furthermore, an option may be provided whereby the attorney can run a similarity search of the specific analyzed provisions against other Core Provisions in other Provision Databases (i.e. for other types of documents) for suggestions as to likely type, sub-type and favorability, both for continuous learning for simply direct usage in the editing of a particular document.

7. Document "Parts."

When the System analyzes a document, it has to take into account that not every part of the text will be a traditional Core Provision type paragraph. Thus, the first step that the System takes in analyzing a document is to identify the document's internal structure. It looks at the words and sentences, and decides what part of the document structure they make up. For example, certain words may be part of a document's title, or an introductory or "recital" paragraph. Or the text may be factual details included in an exhibit or schedule. These issues are likely to be second nature to an attorney reading a document, but the System has to "think" about them.

More specifically, when the System analyzes a document, it assumes that each word of the text can be uniquely assigned to one of seven different categories, as follows:

1. Heading of the document or heading of an exhibit, schedule or other sub-document contained within the larger document
2. Recital paragraph text
3. Section heading
4. Section text for the initial or sole paragraph in the section
5. Section text for any additional separate paragraph in a section
6. Factual detailed text of an exhibit, schedule or similar sub-document
7. Miscellaneous other text Note that the reference to "section" heading includes any headings for sub-sections as well.

This assignment process greatly assists the System in analyzing the document. For example, if the System has determined that certain text in the document is just a description of services in an exhibit, it won't expend computational time or resources determining the best Core Provisions that correspond. In other words, this categorization helps the System narrow down and organize the tasks it must perform.

When a document is first analyzed by the System, it will make preliminary identifications of this text. The primary means for such identification is that a paragraph which begins with a number, particularly ones with short phrases or underlined phrases at the outset of the paragraph, is likely to be section text. If this identification is then similarly made for a sequence of such paragraphs, it is even more certain that the identification is correct. It is likely then that the paragraphs preceding the initial section paragraph are recital paragraphs, and the short initial phrase set off by itself in the front of such recital paragraphs is the document's title. Common names for documents can also be stored in the System's dictionary files for assistance in making this determination.

Once these initial identifications are made, the System will indicate to the attorney user how the document has been broken up into such identifications. The System would then provide means to edit these identifications or accept them. Once accepted, the process of further analyzing the document (e.g. matching the text of its provisions to the closest matching Core Provisions) can commence.

8. Control Over Databases.

Since the use of Provision Databases, and other System databases, are so central to the operation of the System, a large law firm might be concerned about the potential for any one of its attorneys, of any seniority or from any department, to instruct the System to revise the databases to "learn" from various sample documents or the attorney's manual input. For example, perhaps a particular short form merger agreement that an associate receives to review may actually be a very atypical agreement due to unique tax considerations. In that case a firm might not want the System to add information regarding that document to its database. In other words, if information from that agreement was added to the database, it would in effect be misinforming the System by including information that is not standard.

As a solution to this problem, the preferred embodiment of the System would provide permissioning functionality that could be used on a firm-wide basis to control which attorneys are allowed to alter specified databases. For example, perhaps only certain key personnel or partners would be so enabled.

Furthermore, separate personal databases can be provided as well corresponding to individual attorneys. In that event, the attorney can record the information on a project that he is working directly in his own personal databases without any risk to adjusting the database of information for the firm as a whole. Functionality can also be provided to allow specific attorneys or groups of attorneys to share these stand alone databases as well.

9. Document Management System.

It should be noted that the System can be incorporated into a larger document management system for a law firm as a whole. For example, many law firms already have computer systems that store their word processing documents and include information as to the date a document is created, the client and project corresponding to the document, search functionality, etc. . . . The present System disclosed herein can either be provided with such additional functionality or integrated with an existing document management system. Such a management system could store imaged copies of signed versions of documents as well. Additionally, information unique to the System, such as System-generated summary listings of the stored documents can be made available through this document management system as well.

10. Due Diligence.

Although not truly a separate feature or functionality of the System, because of its importance it is worth mentioning the use of the System to conduct what is known as "Due Diligence."

"Due Diligence" is the process whereby a law firm conducts a review of large numbers of documents and agreements pertaining to a particular entity or project. It is most typically seen in the context of an acquisition. If Company X is in negotiations to acquire Company Y, then Company X wants to everything it can about Company Y before the purchase. In particular, it would like to review the various agreements that Company Y has in place with its various counterparties. If Company Y is dependent on certain key suppliers, then if its agreement with those suppliers expire in 10 years or 1 year has a substantial impact on the value of Company Y. Or if those agreements terminate if Company Y is acquired by another entity, then that certainly is very relevant.

Typically Company X will retain a law firm to do this document review. If Company Y has been in business for a substantial period of time, then there are many, many agreements to be reviewed. There are so many, in fact, that the law firm will generally assign several junior associates to dedicate their time to work on this process and prepare a summary diligence memo to report their key findings. More senior attorneys generally do not participate as directly in the process, since these attorneys usually already have oversight roles regarding multiple projects and clients and thus are not positioned to dedicate such a large and continuous block of time to the process.

One drawback to this approach is that it can be difficult for junior associates to quickly determine the importance of the various provisions in the documents they review. In addition, regardless of the level of seniority of the attorneys involved, due diligence is a time consuming process where small errors or omissions can occasionally have far reaching consequences.

The System present herein can assist with this process. It can analyze large numbers of documents and provide summaries. It can also generate reports of atypical provisions. These features can either be used to supplement direct attorney due diligence or a backup to confirm the results of the direct process. Thus, the System can be very valuable in this situation, where large and important transactions are underway.

11. Sentence Based Estimates.

One advanced topic involves the use of a mathematical analysis using favorability of given sentences, or possibly even phrases within a sentence, to estimate the favorability of an unknown provision subject to analysis by the System. Such an estimate of favorability is useful to provide information to the attorney user of the favorability of a provision which is not yet identified in the applicable database as a Core Provision. It is also a useful supplemental technique when a provision is initially being identified as a Core Provision and the System requires additional possible estimates of favorability for a provision about to be classified as a Core Provision.

As previously discussed, the System will generally be able to make estimates as to the nature of an analyzed provision based on information on sample Core Provisions stored in its databases. Or it can simply accept attorney input at the time of analysis.

However, there is another technique available for use within the System as a supplement to the foregoing provisions that involves the analysis of sentences contained within the provision. Rather than using similarity calculations to match known Core Provisions, and thereby estimate such attributes as favorability, instead a similarity analysis is performed on individual sentences within the analyzed provision, or its phrases, to generate estimates for the provision as a whole. This is a "bottom up" approach, as opposed to the other approaches which could be characterized as top down, insofar as they were primarily based on efforts to match similarities based on a provision as a whole instead of the provision's components.

The process involves a number of steps, as follows:

1. Assume favorability of a provision is the average favorability of its sentences.

As an initial matter, a supposition is made that the favorability of a known Core Provision is the average favorability of its constituent sentences. This is a very rough estimate, but should be useful given that this "bottoms up" or "grammar math" approach as a whole may be the last alternative before designating a given provision as "unknown." Furthermore, this averaging approach is generally consistent with what one would expect in a lengthy provision. In a lengthy provision, a single very favorable sentence followed by many sentences of relatively neutral favorability is not likely to result in a very favorable overall core provision. In fact, it is anticipated that a lengthy core provision could be generated that included the single favorable sentence, and would also include many other favorable sentences. Such an alternative Core Provision would likely be more favorable as a whole, which is consistent with the notion of a single favorable sentence having its impact "diluted" as a consequence of the averaging procedure.

Note that a more accurate approach would involve an average of favorabilities where individual sentences are weighted by their relative importance, but it is anticipated that obtaining these weightings would be impractical in day to day usage without a heavy reliance on manual attorney input. Of course even this more advanced procedure would not account for the full meaning of a Core Provision as understood by an attorney, considering the full impact of grammar and the interaction among the sentences of a provision, but this is inherent in the usage of the System as a tool to supplement usage by attorneys, not entirely replace them.

2. Compare Core Provisions of Known Favorability to Mathematically Deduce Particular Sentence Favorability.

Favorability of individual sentences can sometimes be estimated by comparison of Core Provisions which differ only by one sentence, using the approach given above. In other words, suppose the favorability of Core Provision #X is known to be X1 and is made up of sentences a, b and c, and the favorability of Core Provision #Y is known to be Y1 and is made up of sentences a and b. If we let A, B and C be the favorability of sentences a, b and we, then per the supposition in item 1 above, we have:

$$X1=(1/3)*(A+B+C)$$

$$Y1=(1/2)*(A+B)$$

Here X1 and Y1 is known, but A, B and C are unknown. This gives us $$3*X1=A+B+C=2*Y1+C \text{ or}$$

$$C=3*X1-2*Y1.$$

Thus, from the known favorabilities of X1 and Y1, we can estimate the favorability of sentence C. This information would be stored in a Dictionary file entry for C (i.e. in a database file independent of the specific document or deal in which it was contained).

Of course different Core Provisions may later give different estimates for the favorability of C, and these can be retained in the dictionary file entry and themselves averaged to give an even better overall estimate for favorability C.

It is also worth noting that the above procedure is not the only algebraic relationship which could be useful. For example, if the second sentence had four sentences, A, B, C and D, then we could use an approach similar to the above to find a relationship between the favorability of C and D, if not each one separately. Then if we were to later find a value for C from working with other Core Provisions, we could use this relationship to correspondingly solve for an estimate for the favorability for D at that time as well. It is worth noting that the above procedure involving just three sentences also provided useful information on the sum of A and B, in the same manner.

3. Attorney input can be used. Occasionally attorney input for specific sentences can be requested.

4. Average sentence favorability as applicable to estimate favorability for an otherwise unknown provision. Over time the Dictionary files will accumulate substantial information on many different sentences. Suppose, for example, it accumulates information on sentences c, d and e, but none on f. As a very rough estimate of the favorability of a provision consisting of sentences C, D, E and F, it could average the favorabilities of C, D, and E, omit the impact of F, and arrive at a result. Furthermore, the Dictionary file would contain information on the typical types and sub-types of the provisions in which the sentences c, d and e appear. This information can be used to assign a possible type and sub-type to the analyzed provision as well, likely using the first sentence as a rough estimate of the kind of provision unless there is overlap among the other sentences for another kind of provision. The type and subtype of greatest overlap would then be used as the estimate for the analyzed provision.

12. Common Editing Platform.

An additional feature of the System, which would be an optional enhancement in practice, would be a common web based, internet based or other network based interface in which various parties that are users of the System can simultaneously edit documents and/or projects. For example, two opposing sides of a transaction could set up a conference call in which the business people and law firms participate. There would be one common website that all parties could log on to for purposes of view access, and certain enabled parties (e.g. appropriate lawyers) would log on to for both view and edit access. Assuming both law firms are subscribers to the System, each would be able to view the document under discussion through a web-based version of the System's graphical user interface. Depending on option settings each law firm could view the document through an analysis by its own databases, the databases of one of the particular parties, or databases provided through the website. Then, as negotiations proceeded, the parties could revise the document in real time, as they reached agreement on various points, and negotiations could proceed much more rapidly.

13. Reorder Document

Functionality can also be provided to reorder sections within a document. Cross references can be maintained intact and updated automatically during this process as well.

14. Document Styles

Certain types of document include specific styles or formats, such as specific fonts for a cover page or the inclusion of table-based information. This information would be stored within the System as appropriate so that such formatting would be available to be applied to the corresponding Kind of document.

15. Flowchart Summary

Figure 7:
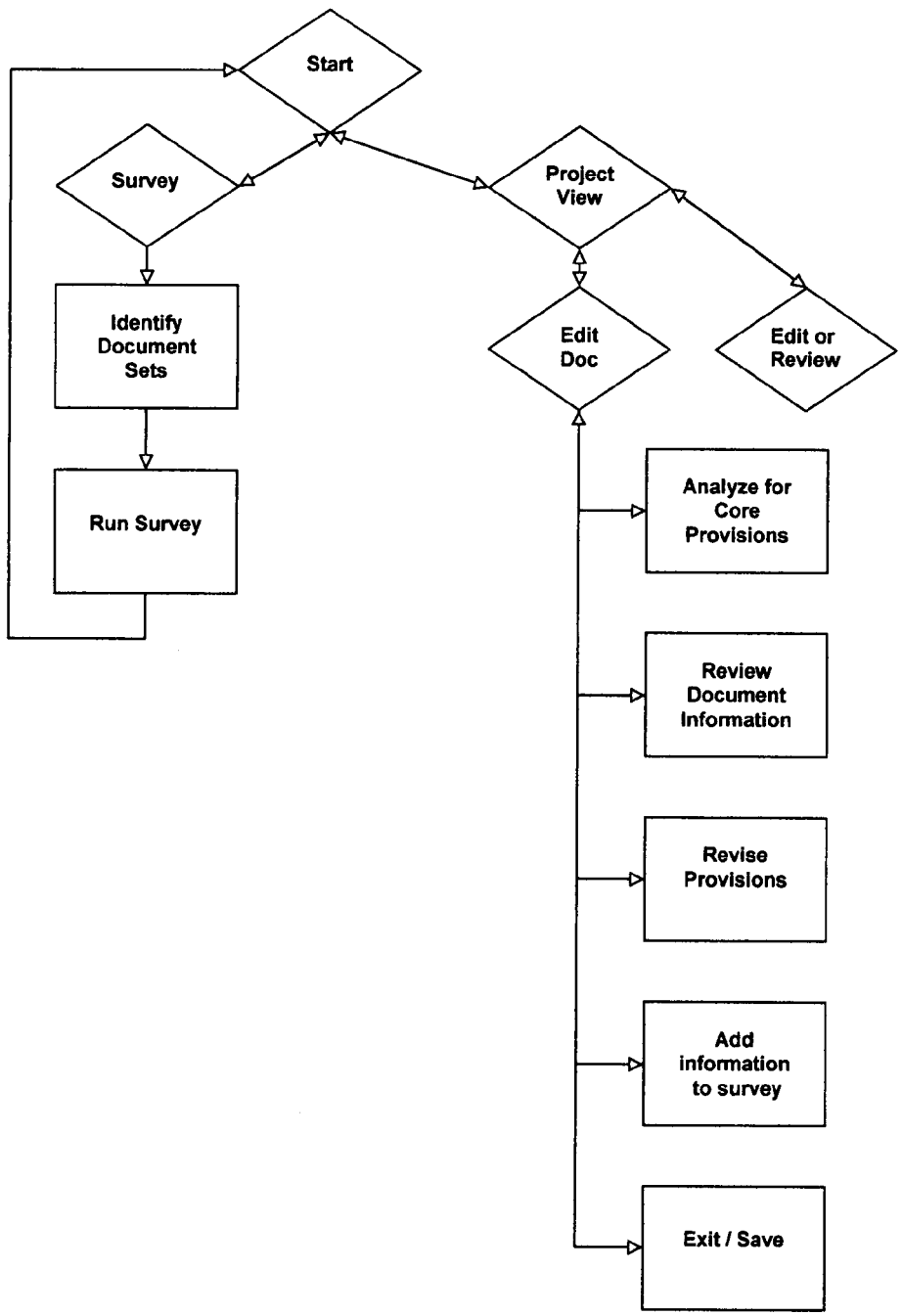
FIG. 7 shows a summary flowchart setting forth a general relationship of the main functionalities of the System.

For summary purposes, a general overview flowchart of the System's functionality is set forth in FIG. 7. As can be seen, once the program starts, there are two fundamental choices: (1) run survey functionality; or (2) enter the project view for a specific project.

If survey functionality is initiated, the user needs to identify the sets of documents to be surveyed (likely imported directly from a law firm's document management system, even if initially acquired from another source) and then the user can provide input as applicable as the survey is running. On completion the information "learned" would be added to the applicable System databases or dictionary files.

If the user decides to enter the project view for a specific project, there are basically three broad options: (1) return to the start window/survey functionality; (2) edit or review project contents, or email documents; or (3) enter the document view for a particular selected document within the project.

If the user decides to enter the document view for a particular document, there are basically five broad options: (1) analyze the document to identify Core Provisions most closely matching the document's existing provisions (to the extent not already so analyzed through initiating this functionality through the project view); (2) review document information, such as the text of the document, how closely certain Core Provisions match provisions of the document, or correlation information; (3) edit the document, including to revise provisions to match selected Core Provisions; (4) add specified information "learned" during the analysis or editing of this document to the applicable survey databases or files (assuming the user is permissioned for this capability); or (5) exit or save the document and return to the project view.

This flowchart is, of course, just a summary of possibilities set forth in greater detail earlier in this specification.

16. Other Types of Documents and Miscellaneous

The System presented herein focuses on legal document. However, it could also be applied to other types of documents which are not generally of a legal nature, but which exhibit comparable quasi-repetitive text or other patterns.

Finally, it is worth noting that much of the specification herein assumes that an agreement or document will be broken out into sections each only one paragraph long. This is not always the case, as sometimes a single section will consist of two or more paragraphs. While this is not the traditional drafting approach, if it does occur, it can be readily handled using either of the following approaches: (1) internally combine the paragraphs into a single provision and store the applicable paragraph break in the internal system files; or (2) break up the section for processing into two different provisions each denoted by their paragraph number (e.g., as types "indemnification/general—paragraph 1" and "indemnification/general—paragraph 2").

I claim:

1. A computer system for processing user selected kind of documents, comprising:
    a memory;
    a processor coupled to the memory and operative to perform the operations of:
        conducting a survey of a quantity of documents of said kind to identify textual patterns present in such documents, which textual patterns are substantially similar to common textual provisions which frequently recur in said kind of said documents; where substantial similarity is determined by: (x) degree of similarity as a user of said kind of said documents, of ordinary skill, would recognize said patterns or provisions to be variants of one another as would appear in ordinary course use of said kind of said documents, or (y) numerical similarity through satisfaction of a numerical threshold present in said computer system such that a numerical comparison of strings of text is in excess of said numerical threshold;
        analyzing other existing documents or other existing sets of documents to determine the presence or absence of said identified textual patterns which were identified in said survey;
    receiving a subjective rank of favorability towards a party contractually agreeing to be bound by at least one block of text identified as being associated with a textual pattern, and a length of said at least one block of text for said at least one block of text;
    editing said other existing documents or other existing sets of documents for a user of said computer system to revise said other existing document or said other existing set of documents in a manner including exhibiting said rank of favorability towards said party to a said document and a length for said at least one block of text to include or exclude text of such identified textual patterns.

2. The computer system of claim 1 further performing an operation of exhibiting text of an existing document and receiving changes to said text.

3. The computer system of claim 1 further performing an operation of ordering identified textual patterns by length.

4. The computer system of claim 1 further performing an operation of presenting said blocks of text ordered by favorability.

5. The computer system of claim 4 further performing an operation of ordering said blocks of text by length.

6. The computer system of claim 1 further carrying out an operation of surveying said documents and calculating numerical correlations corresponding to the likelihood of presence or absence of said identified textual patterns.

7. The computer system of claim 1 further carrying out an operation of surveying groups of said documents of different classes, where such classes of documents are frequently concurrently present in user identified types of transactions, and for calculating numerical correlations corresponding to the likelihood of presence or absence of said concurrence.

8. The computer system of claim 1 further carrying out an operation of exhibiting a common editing platform such that distinct users of said computer system contemporaneously edit the same document or sets of documents, and one of said distinct users can view edits from another said distinct user.

9. The computer system of claim 1 further carrying out an operation of exchanging the roles of two parties to a document in a given provision by replacing the terminology which references the first party with the terminology that references the second party, and replacing the terminology that references the second party with the terminology that references the first party.

10. The computer system of claim 1 further carrying out an operation of internal cross referencing to provisions within said documents to be analyzed through replacement of said cross references with descriptive information regarding said provisions.

11. The computer system of claim 1 further carrying out estimating favorability of a provision by an averaging or other weight-based combination of favorability of constituent sentences of said provision.

12. The computer system of claim 1 further carrying out a step of populating a grid of length and favorability properties of said identified textual patterns by: (i) rounding favorabilities to a specific level of accuracy to determine specific discrete grid axis values; (ii) initial assignment of provisions to grid points based on length and favorability; (iii) assigning provisions to otherwise unassigned grid points in a specific row of said grid by repetitively replicating the assignment to other elements in a given row until another initially assigned grid point is encountered or a boundary value is reached; and (iv) assigning certain identified patterns to otherwise unassigned grid points in other rows by replicating entire row segments except for such grid values where an initial assignment has been established or a boundary value is reached.

13. The computer system of claim 1 further carrying out integrating said system with a document management system.

14. The computer system claim 1, wherein said subjective rank of favorability is unrelated to a frequency of occurrence.

15. The system of claim 1, wherein said exhibiting of subjective favorability towards a party is modified based on ranks of favorability by multiple parties.

16. The system of claim 15, wherein subjective rankings of favorability are received by at least two attorneys at a law firm, and a ranking of one attorney is given more weight than a ranking of another attorney based on a position within a law firm of each said attorney providing a said ranking.

17. The system of claim 1, wherein said subjective ranking of favorability is obtained, at least in part, based on a prior subjective ranking of favorability of a said provision with a said similar textual provision.

18. The system of claim 17, wherein said subjective ranking of favorability is further obtained, at least in part, based on a dictionary lookup.

19. A method of drafting a document, comprising the steps of:

conducting a survey of a quantity of documents of said kind to identify textual patterns present in such documents, which textual patterns are substantially similar to common textual provisions which frequently recur in said kind of said documents; where substantial similarity is determined by: (x) degree of similarity as a user of said kind of said documents, of ordinary skill, would recognize said patterns or provisions to be variants of one another as would appear in ordinary course use of said kind of said documents, or (y) numerical similarity through satisfaction of a numerical threshold present in said computer system such that a numerical comparison of strings of text is in excess of said numerical threshold;

analyzing other existing documents or other existing sets of documents to determine the presence or absence of said identified textual patterns which were identified in said survey;

receiving a subjective rank of favorability towards a party contractually agreeing to be bound by at least one block of text identified as being associated with a textual pattern, and a length of said at least one block of text for said at least one block of text;

editing said other existing documents or other existing sets of documents for a user of said computer system to revise said other existing document or said other existing set of documents in a manner including exhibiting said rank of favorability towards said party to a said document and a length for said at least one block of text to include or exclude text of such identified textual patterns.

\* \* \* \* \*